United States Patent
Francis

(10) Patent No.: US 11,242,949 B1
(45) Date of Patent: Feb. 8, 2022

(54) PIPE HEATING SYSTEMS AND METHODS

(71) Applicant: Trinity Bay Equipment Holdings, LLC, Houston, TX (US)

(72) Inventor: Kirk Spencer Francis, Richmond, TX (US)

(73) Assignee: Trinity Bay Equipment Holdings, LLC, Houston, TX (US)

(*) Notice: Subject to any disclaimer, the term of this patent is extended or adjusted under 35 U.S.C. 154(b) by 0 days.

(21) Appl. No.: 17/408,725

(22) Filed: Aug. 23, 2021

(51) Int. Cl.
- F16L 53/00 (2018.01)
- F16L 53/35 (2018.01)
- F16L 53/32 (2018.01)
- F16L 1/06 (2006.01)

(52) U.S. Cl.
CPC ............. F16L 53/35 (2018.01); F16L 1/065 (2013.01); F16L 53/32 (2018.01)

(58) Field of Classification Search
CPC . F16L 53/30; F16L 53/32; F16L 53/34; F16L 53/35; F16L 53/57; F16L 53/38
See application file for complete search history.

(56) References Cited

U.S. PATENT DOCUMENTS

| | | | | |
|---|---|---|---|---|
| 2,516,950 A | * | 8/1950 | Bragg | F16L 53/35 219/523 |
| 2,568,578 A | * | 9/1951 | Bennett | F16L 53/37 392/478 |
| 3,191,671 A | * | 6/1965 | Horne | F16L 53/32 165/84 |
| 3,275,803 A | * | 9/1966 | True | F16L 53/38 219/535 |
| 4,124,039 A | * | 11/1978 | St. Laurent | F16L 53/32 138/35 |
| 4,214,147 A | * | 7/1980 | Kraver | F28F 19/006 392/468 |
| 4,816,649 A | * | 3/1989 | Eilentroop | H05B 3/56 219/549 |
| 6,015,015 A | * | 1/2000 | Luft | E21B 17/1007 166/241.6 |
| 6,041,821 A | * | 3/2000 | Grossman | E03B 7/14 134/22.1 |
| 6,142,707 A | * | 11/2000 | Bass | E21B 17/015 405/158 |
| 6,250,371 B1 | * | 6/2001 | Amerman | E21B 33/13 165/45 |
| 6,264,401 B1 | * | 7/2001 | Langner | F16L 53/37 405/169 |

(Continued)

*Primary Examiner* — Benjamin F Fiorello
(74) *Attorney, Agent, or Firm* — Conrad J. Hsu

(57) ABSTRACT

Techniques for implementing and/or operating a system that includes a flexible pipe, which is formed into a pipe coil, and a pipe heating apparatus. The pipe heating apparatus includes a bore device to be moved to a target position within the pipe bore of the flexible pipe to facilitate isolating a segment of the flexible pipe from a remainder of the flexible pipe, one or more heating conduits connected to the bore device such that the one or more heating conduits are disposed in an upstream region of the pipe bore behind the bore device, and one or more heat sources to be connected to the bore device via the one or more heating conduits to enable the one or more heating conduits to heat the segment of the flexible pipe to facilitate unwinding the segment of the flexible pipe from the pipe coil.

20 Claims, 8 Drawing Sheets

(56) References Cited

U.S. PATENT DOCUMENTS

| | | | | |
|---|---|---|---|---|
| 6,564,011 B1* | 5/2003 | Janoff | | E21B 36/04 |
| | | | | 392/480 |
| 9,982,419 B1* | 5/2018 | Emerson | | E03B 7/14 |
| 10,526,164 B2* | 1/2020 | Barnett | | B65H 57/04 |
| 10,694,591 B2* | 6/2020 | Sarangi | | F16L 1/065 |
| 10,739,225 B1* | 8/2020 | Francis | | G01M 3/022 |
| 2017/0009926 A1* | 1/2017 | Marucci | | H05B 1/02 |

* cited by examiner

PIPE HEATING SYSTEMS AND METHODS

BACKGROUND

The present disclosure generally relates to pipeline systems and, more particularly, to a pipe heating apparatus that may be implemented and/or operated to facilitate heating a segment (e.g., portion and/or section) of a pipe that is to be deployed in a pipeline system.

Pipeline systems are often used to transport (e.g., convey) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, potable water, fresh water, fracturing fluid, flowback fluid, carbon dioxide, or any combination thereof.

To facilitate fluid transportation, a pipeline system generally includes pipe, for example, implemented using one or more pipe segments. A pipe generally includes tubing, which defines (e.g., encloses) a pipe bore that provides a primary fluid conveyance (e.g., flow) path through the pipe. More specifically, the tubing of a pipe may be implemented to facilitate isolating (e.g., insulating) fluid being conveyed within its pipe bore from environmental conditions external to the pipe, for example, to reduce the likelihood of the conveyed (e.g., bore) fluid being lost to the external environmental conditions and/or the external environmental conditions contaminating the conveyed fluid (e.g., clean and/or potable water).

When its tubing is flexible, to facilitate improving transportation efficiency and/or storage efficiency, a pipe may be formed (e.g., wound and/or wrapped) into a pipe coil (e.g., spooled on a pipe drum or a pipe reel) before being deployed in a pipeline system. In fact, in some instances, pipe may be deployed in a pipeline system directly from a pipe coil. However, at least in some instances, deployment of pipe from a pipe coil may be affected by the temperature of the tubing of the pipe. In particular, flexibility of the tubing of a pipe may generally decrease as temperature of the pipe tubing decreases, thereby affecting (e.g., reducing) the ability to unwind pipe from a pipe coil and, thus, the ability to deploy pipe directly from the pipe coil into a pipeline system.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a system includes a flexible pipe that is formed into a pipe coil, in which the flexible pipe includes tubing that defines a pipe bore and a fluid conduit within an annulus of the tubing, and a pipe heating apparatus. The pipe heating apparatus includes a bore device to be moved to a target position within the pipe bore of the flexible pipe to facilitate isolating a segment of the flexible pipe from a remainder of the flexible pipe, one or more heating conduits connected to the bore device such that the one or more heating conduits are disposed in an upstream region of the pipe bore behind the bore device when the bore device is disposed within the pipe bore of the flexible pipe, and one or more heat sources to be connected to the bore device via the one or more heating conduits to enable the one or more heat sources to heat the one or more heating conduits disposed within the upstream region of the pipe bore and, thus, the one or more heating conduits to heat the segment of the flexible pipe to facilitate unwinding the segment of the flexible pipe from the pipe coil.

In another embodiment, a method of operating a pipe heating apparatus includes connecting one or more heating conduits between a heat source and a bore device in the pipe heating apparatus, inserting the bore device into a pipe bore of a flexible pipe that is formed into a pipe coil, and operating the heat source to facilitate moving the bore device to a target position in the pipe bore of the flexible pipe that facilitates isolating a segment of the flexible pipe that is to be deployed directly from the pipe coil into a pipeline system and heating the segment of the flexible pipe to facilitate unwinding the segment of the flexible pipe from the pipe coil and deploying the segment of the flexible pipe directly from the pipe coil into the pipeline system.

In another embodiment, a pipe heating apparatus, a sealing bore device that seals an upstream region of a pipe bore in a flexible pipe behind the sealing bore device that corresponds with a segment of the flexible pipe that is to be deployed in a pipeline system from a downstream region of the pipe bore that corresponds with a remainder of the flexible pipe, a heating fluid source that outputs heated fluid, a heating fluid conduit fluidly connected between the heating fluid source and the sealing bore device such that heating fluid conduit is disposed within the upstream region of the pipe bore when the sealing bore device is disposed within the pipe bore of the flexible pipe, and a bore seal that seals the pipe bore of the flexible pipe behind the sealing device to facilitate using heated fluid output by the heating fluid source to heat the segment of the flexible pipe and selectively using heated fluid output by the heating fluid source to move the sealing bore device along the pipe bore of the flexible pipe.

DETAILED DESCRIPTION

Figure 1:
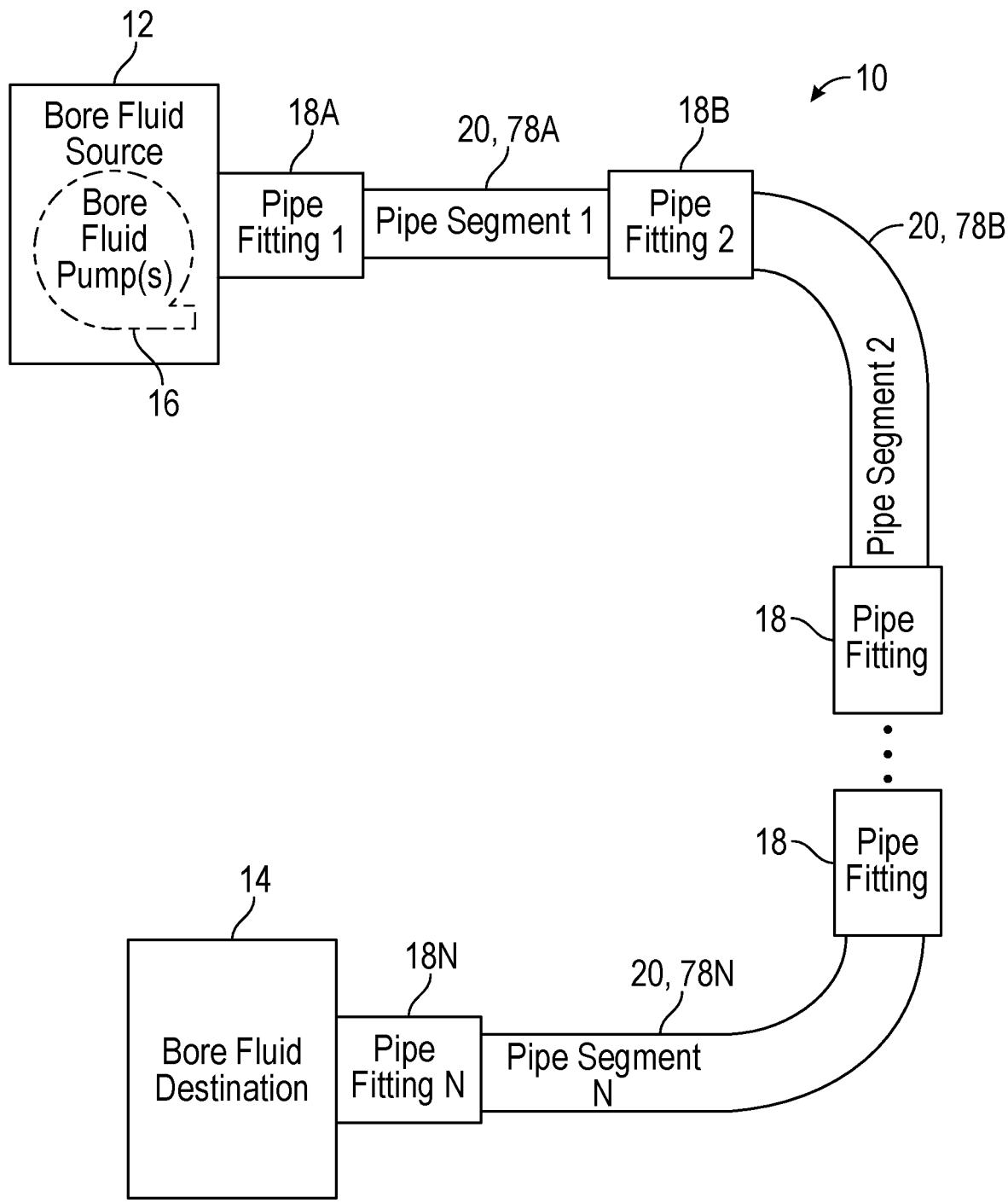
FIG. 1 is a block diagram of an example of a pipeline system including pipe segments and pipe fittings, in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure relates to pipeline systems, which generally include pipe (e.g., one or more pipe segments) secured and sealed in pipe fittings, such as a midline pipe fitting and/or a pipe end fitting. In some instances, a flexible pipe may be formed (e.g., wound and/or wrapped) into a pipe coil before being deployed in a pipeline system, for example, to facilitate improving storage efficiency and/or transportation efficiency of the flexible pipe. In fact, in some such instances, flexible pipe may be unwound from a pipe coil and deployed directly in a pipeline system, thereby facilitating an improvement in deployment efficiency of the pipeline system.

However, the flexibility of flexible pipe may generally decrease as the temperature of its tubing decreases. In other words, the colder its tubing, the more resistance a flexible pipe may exert against a change in shape. In fact, when too cold, the temperature of its tubing may limit the ability of a flexible pipe to be unwound from a pipe coil and, thus, the ability to deploy the flexible pipe directly from the pipe coil into a pipeline system, thereby potentially limiting the deployment efficiency of the pipeline system.

Accordingly, to facilitate improving pipeline deployment efficiency, the present disclosure provides techniques for implementing and/or operating a pipe heating apparatus to facilitate heating flexible pipe, for example, while the flexible pipe is formed in a pipe coil and before the flexible pipe is deployed in a pipeline system. In some instances, only a segment (e.g., portion and/or section) of a flexible pipe that is formed in a pipe coil may be deployed in a pipeline system at one time. In particular, in such instances, the segment of the flexible pipe may be unwound from the pipe coil and cut off from the remainder of the flexible pipe for deployment in the pipeline system.

As such, to facilitate reducing power consumption resulting from pipe heating and, thus, improving pipe heating efficiency, a pipe heating apparatus may generally include a bore device, which is inserted into a pipe bore of a flexible pipe via an open end of the flexible pipe and moved within the pipe bore to facilitate isolating a segment of the flexible pipe, for example, which is to be cut off from a remainder of the flexible pipe and deployed in a pipeline system for heating. In particular, in some embodiments, a bore device in a pipe heating apparatus may be a sealing bore device that is implemented to seal an upstream region of a pipe bore behind the sealing bore device from a downstream region of the pipe bore in front of the sealing bore device. Accordingly, in some such embodiments, a sealing bore device may be moved along the pipe bore of a flexible pipe at least in part by injecting (e.g., supplying) fluid into the pipe bore to pressurize an upstream region of the pipe bore behind the sealing bore device.

To facilitate injecting fluid into the pipe bore of a flexible pipe, in some embodiments, a pipe heating apparatus may include a fluid source (e.g., pump) and one or more fluid conduits, such as a hose, which are to be fluidly connected between the fluid source and the pipe bore. Additionally, in some embodiments, a segment of a flexible pipe that is isolated by a sealing bore device may be heated at least in part by supplying heated fluid to the flexible pipe segment. In fact, to facilitate reducing implementation-associated cost (e.g., physical footprint and/or component count) of a pipe heating apparatus, in some such embodiments, the same fluid source and the same one or more fluid conduits may be used to move a sealing bore device within the pipe bore of a flexible pipe as well as a heat a segment of the flexible pipe and, thus, the fluid source may be a heating fluid source and the one or more fluid conduits may each be a heating fluid conduit, such as a hose. In any case, to facilitate pressuring an upstream region of the pipe bore in a flexible pipe device and, thus, moving a sealing bore device along the pipe bore, in some embodiments, a pipe heating apparatus may additionally include a bore seal that is used to seal an open end of the flexible pipe and, thus, the pipe bore.

However, in other embodiments, a pipe heating apparatus may additionally include a winch, which has a pulling cable or a heating conduit that is fed through the pipe bore of a flexible pipe and connected to a (e.g., sealing) bore device wrapped (e.g., wound) thereon. Accordingly, in such embodiments, the winch may be operated to retract the pulling cable or the heating conduit to facilitate pulling the bore device along the pipe bore. Moreover, in other embodiments, a bore device in a pipe heating apparatus may be a crawler bore device, which includes an electric motor and one or more device wheels that are connected to the electric motor. Accordingly, in such embodiments, a crawler bore device may be operated to propel (e.g., drive and/or move) itself along a pipe bore when electrical power is supplied to the electric motor in the crawler bore device.

To facilitate supplying electrical power to a crawler bore device, in some embodiments, a pipe heating apparatus may additionally include an electrical power source, such as a power supply and/or an electrical grid, and one or more electrical conduits, such as a wire or cable, which electrically connect the electrical power source and the crawler bore device. Additionally, in some embodiments, a segment of a flexible pipe that is isolated by a crawler bore device may be heated at least in part using heat produced by the resistance of electrically conductive material due to electrical power being passed therethrough. In fact, to facilitate reducing implementation-associated cost (e.g., physical footprint and/or component count) of a pipe heating apparatus, in some embodiments, the same electrical power source and the same one or more electrical conduits may be used to move a crawler bore device within the pipe bore of a flexible pipe as well as to a heat a segment of the flexible pipe and, thus, the electrical power source may be a heating electrical power source and the one or more fluid conduits may each be a heating electrical conduit, such as a heat trace cable. In this manner, as will be described in more detail below, a pipe heating apparatus may be implemented and/or operated to facilitate selectively heating a segment of a flexible pipe, which, at least in some instances, may facilitate improving deployment efficiency of a pipeline system in which the flexible pipe segment is to be deployed, for example, by increasing flexibility of the flexible pipe to enable the flexible pipe segment to be deployed from a pipe coil directly into the pipeline system.

To help illustrate, an example of a pipeline system 10 is shown in FIG. 1. As in the depicted example, the pipeline system 10 may be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16, which operate to inject (e.g., pump and/or supply) fluid from the bore fluid source 12 into a bore of the pipeline system 10. However, it should be appreciated that the depicted example is merely intended to be illustrative and not limiting. In particular, in other embodiments, a bore fluid pump 16 may not be included at the bore fluid source 12, for example, when fluid flow through the bore of the pipeline system 10 is produced by gravity. Additionally or alternatively, in other embodiments, a bore fluid pumps 16 may be included in the pipeline system 10 and/or at the bore fluid destination 14.

In any case, to facilitate transporting fluid from a bore fluid source 12 to a bore fluid destination 14, a pipeline system 10 generally has pipe fittings 18 and pipe 20, which is implemented using one or more pipe segments 78. For example, the depicted pipeline system 10 includes a first pipe segment 78A, a second pipe segment 78B, and an Nth pipe segment 78N. Additionally, the depicted pipeline system 10 includes a first pipe (e.g., end) fitting 18A, which connects the bore fluid source 12 to the first pipe segment 78A, a second pipe (e.g., midline) fitting 18B, which connects the first pipe segment 78A to the second pipe segment 78B, and an Nth pipe (e.g., end) fitting 18N, which connects the Nth pipe segment 78N to the bore fluid destination 14.

However, it should again be appreciated that the depicted example is merely intended to be illustrative and not limiting. In particular, in other embodiments, a pipeline system 10 may include fewer than three (e.g., two or one) pipe segments 78 or more than three (e.g., four, five, or more) pipe segment 78. Additionally or alternatively, in other embodiments, a pipeline system 10 may include fewer than four (e.g., three or two) pipe fittings 18 or more than four (e.g., five, six, or more) pipe fittings 18.

In any case, as described above, a pipe 20 generally includes tubing that may be used to convey (e.g., transfer and/or transport) water, gas, oil, and/or any other suitable type of fluid. The tubing of a pipe 20 may be made of any suitable type of material, such as plastic, metal, and/or a composite (e.g., fiber-reinforced composite) material. In fact, as will be described in more detail below, in some embodiments, the tubing of a pipe 20 may include multiple different tubing layers. For example, the tubing of a pipe 20 may include a first high-density polyethylene (e.g., internal corrosion protection) layer, one or more intermediate (e.g., metal, composite, and/or reinforcement) layers external to the first high-density polyethylene layer, and a second high-density polyethylene (e.g., external corrosion protection) layer external to the one or more intermediate layers.

Additionally, as in the depicted example, one or more (e.g., second and/or Nth) pipe segments 78 in a pipeline system 10 may be curved. To facilitate implementing a curve in a pipe 20, in some embodiments, the pipe 20 may be flexible, for example, such that the pipe 20 is spoolable on a reel and/or in a coil (e.g., during transport and/or before deployment of the pipe 20). In other words, in some embodiments, pipe 20 in the pipeline system 10 may be flexible pipe 20, such as bonded flexible pipe, unbonded flexible pipe, flexible composite pipe (FCP), thermoplastic composite pipe (TCP), or reinforced thermoplastic pipe (RTP). In fact, at least in some instances, increasing flexibility of a flexible pipe 20 may facilitate improving deployment efficiency of a pipeline system 10, for example, by obviating a curved (e.g., elbow) pipe fitting 18 and/or enabling the flexible pipe 20 to be transported to the pipeline system 10, deployed in the pipeline system 10, or both using a tighter spool.

To facilitate improving pipe flexibility, in some embodiments, the tubing of a flexible pipe 20 that defines (e.g., encloses) its pipe bore may additionally define free space (e.g., one or more gaps) devoid of solid material within its annulus. In fact, in some embodiments, free space defined within the tubing of a flexible pipe 20 may run (e.g., span) the length of the flexible pipe 20 and, thus, define (e.g., enclose) a fluid conduit (e.g., free space) in the annulus of the tubing, which is separate from the pipe bore. In other words, in such embodiments, fluid may flow through a flexible pipe 20 via its pipe bore, free space (e.g., gaps and/or one or more fluid conduits) defined within its tubing annulus, or both.

Figure 2:
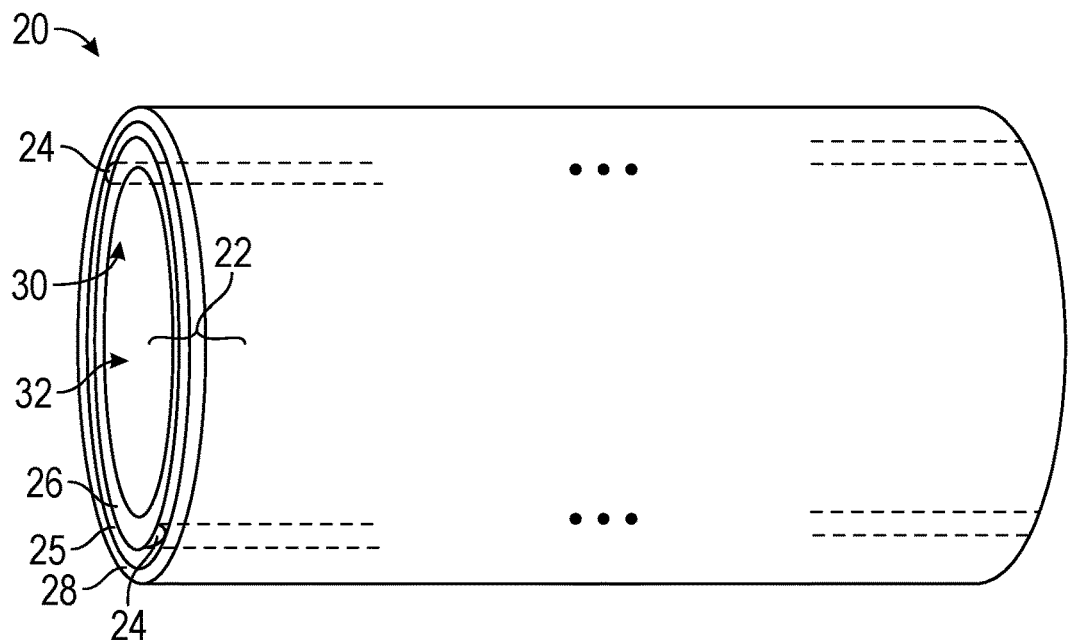
FIG. 2 is a side view of an example of a pipe that includes a pipe bore defined by its tubing as well as fluid conduits implemented within an annulus of its tubing, in accordance with an embodiment of the present disclosure.

To help illustrate, an example of a flexible pipe 20, which includes tubing 22 with fluid conduits (e.g., free space) 24 defined in its annulus 25, is shown in FIG. 2. As depicted, the flexible pipe tubing 22 has multiple tubing layers including an inner barrier (e.g., liner) layer 26 and an outer barrier (e.g., shield and/or sheath) layer 28. In some embodiments, the inner barrier layer 26 and/or the outer barrier layer 28 of the flexible pipe tubing 22 may be composite material and/or plastic, such as high-density polyethylene (HDPE), raised temperature polyethylene (PE-RT), cross-linked polyethylene (XLPE), polyamide 11 (PA-11), polyamide 12 (PA-12), polyvinylidene difluoride (PVDF), or any combination thereof. Although a number of particular layers are depicted, it should be understood that the techniques described in the present disclosure may be broadly applicable to all spoolable pipe body structures including, but not limited to, unbonded reinforced thermoplastic pipes, bonded reinforced thermoplastic pipes, and single-layer or multi-layer plastic pipes. In any case, as depicted, an inner surface 30 of the flexible pipe tubing 22 defines (e.g., encloses) a pipe bore 32 through which fluid can flow, for example, to facilitate transporting fluid from a bore fluid source 12 to a bore fluid destination 14.

Additionally, as depicted, the annulus 25 of the flexible pipe tubing 22 is defined between its inner barrier layer 26 and its outer barrier layer 28. As will be described in more detail below, the tubing annulus 25 may include one or more intermediate layers. Furthermore, as depicted, fluid conduits (e.g., free space and/or gaps) 24 running along the length of the flexible pipe 20 are defined (e.g., enclosed) in the tubing annulus 25. As described above, a fluid conduit 24 in the tubing annulus 25 may be devoid of solid material. As such, pipe tubing 22 that includes one or more fluid conduits 24 defined in its annulus 25 may include less solid material and, thus, exert less resistance to flexure, for example, as compared to solid pipe tubing 22 and/or pipe tubing 22 that does not include fluid conduits 24 defined therein. Moreover, to facilitate further improving pipe flexibility, in some embodiments, one or more tubing layers in a flexible pipe 20 may be unbonded from one or more other tubing layers and, thus, the flexible pipe 20 may be an unbonded pipe.

However, it should be appreciated that the depicted example is merely intended to be illustrative and not limiting. In particular, in other embodiments, a flexible pipe 20 may include fewer than two (e.g., one) or more that two (e.g., three, four, or more) fluid conduits 24 defined in its tubing annulus 25. Additionally, in other embodiments, a fluid conduit 24 defined in the tubing annulus 25 of a flexible pipe 20 may run non-parallel to the pipe bore 32 of the flexible pipe 20, for example, such that the fluid conduit 24 is skewed relative to the axial extent (e.g., longitudinal axis) of the flexible pipe 20.

Figure 3:
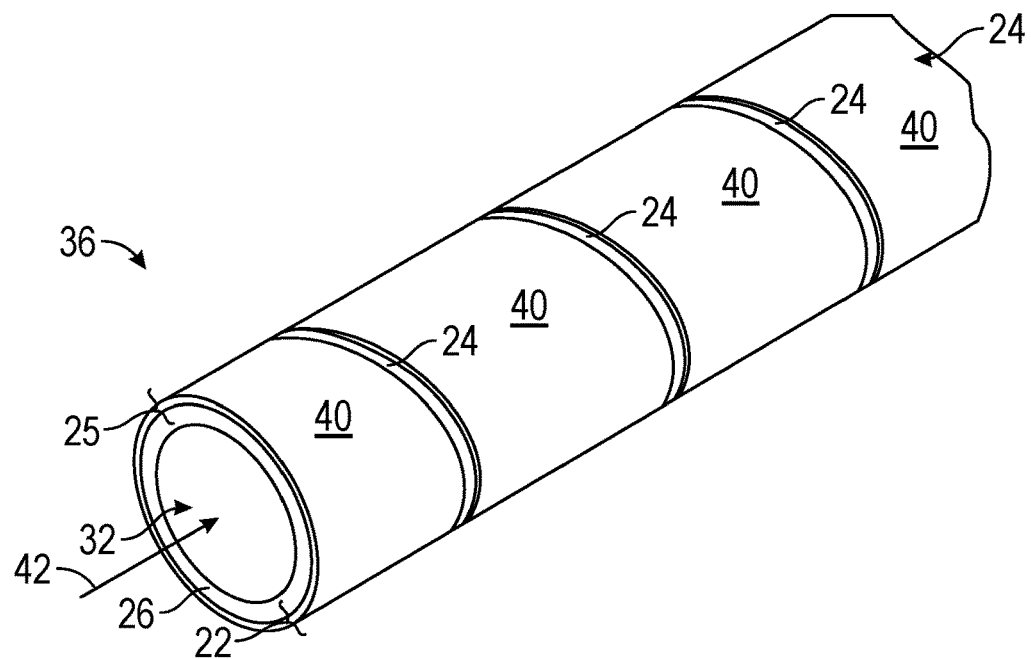
FIG. 3 is an example of a portion of a pipe with a helically shaped fluid conduit defined within the annulus of its tubing, in accordance with an embodiment of the present disclosure.

To help illustrate, an example of a portion 36 of a flexible pipe 20, which includes an inner barrier layer 26 and an intermediate layer 34 included in the annulus 25 of its pipe tubing 22, is shown in FIG. 3. In some embodiments, one or more intermediate layers 34 of the flexible pipe tubing 22 may be composite material and/or metal, such as carbon steel, stainless steel, duplex stainless steel, super duplex stainless steel, or any combination thereof. In other words, at least in some such embodiments, an intermediate layer 34 of the flexible pipe tubing 22 may be made using electrically conductive material, which, at least in some instances, may enable communication of electrical (e.g., sensor and/or control) signals via the intermediate layer 34.

In any case, as depicted, the intermediate layer 34 is helically disposed (e.g., wound and/or wrapped) on the inner barrier layer 26 such that free space is left between adjacent windings to define a fluid conduit 24. In other words, in some embodiments, the intermediate layer 34 may be implemented at least in part by winding a metal (e.g., steel) strip around the inner barrier layer 26 at a non-zero lay angle (e.g., fifty-two degrees) relative to the longitudinal extent 42 of the pipe bore 32. In any case, as depicted, the resulting fluid conduit 24 runs helically along the flexible pipe 20, for example, such that the fluid conduit 24 is skewed fifty-two degrees relative to the longitudinal extent 42 of the pipe bore 32.

In some embodiments, an outer barrier layer 28 may be disposed directly over the depicted intermediate layer 34 and, thus, cover and/or define (e.g., enclose) the depicted fluid conduit 24. However, in other embodiments, the tubing annulus 25 of a flexible pipe 20 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that free space is left between adjacent windings to implement one or more corresponding fluid conduits 24 in the tubing annulus 25 of the flexible pipe 20.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer barrier layer 28 may be disposed over the third other intermediate layer 34 and, thus, cover (e.g., define and/or enclose) the other fluid conduit 24 in the third other intermediate layer 34.

In any case, as described above, in some instances, a flexible pipe 20 may be formed (e.g., wound and/or wrapped) into a pipe coil, for example, spooled on a pipe drum or a pipe reel. In particular, a flexible pipe 20 may be formed into a pipe coil before deployment in a pipeline system 10, for example, to facilitate improving storage efficiency and/or transportation efficiency of the flexible pipe. In fact, in some embodiments, a pipe deployment system may be implemented and/or operated to facilitate deploying flexible pipe 20 from a pipe coil directly into a pipeline system 10.

Figure 4:
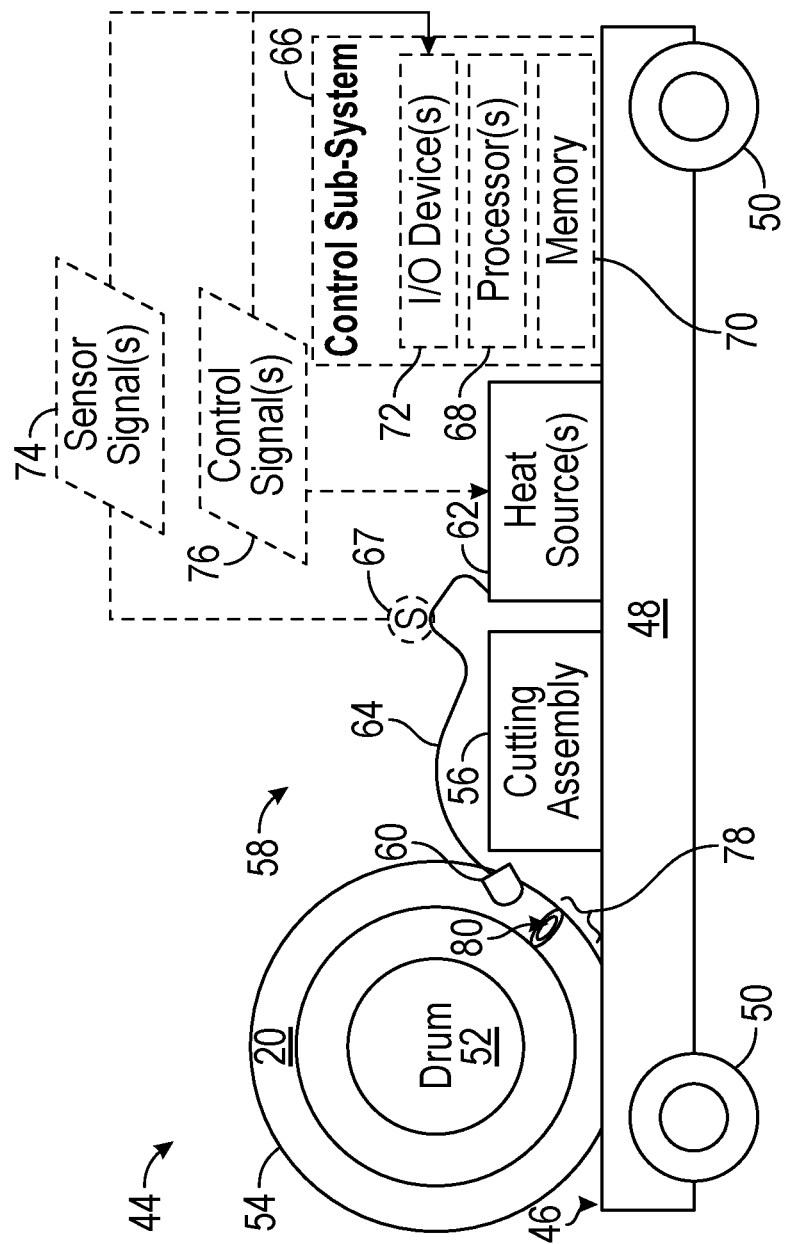
FIG. 4 is a block diagram of an example of a pipe deployment system that includes a pipe heating apparatus, in accordance with an embodiment of the present disclosure.

To help illustrate, an example of a pipe deployment system 44 is shown in FIG. 4. As depicted, the pipe deployment system 44 generally includes a pipe deployment vehicle 46, which has a vehicle frame 48 and one or more vehicle wheels 50 rotatably secured to the vehicle frame 48. In particular, in some embodiments, the pipe deployment vehicle 46 may be a pipe deployment trailer, for example, which may be connected and moved (e.g., towed and/or pulled) to a pipeline system 10 by a towing vehicle in the pipe deployment system 44. However, in other embodiments, the pipe deployment vehicle 46 may be self-propelled, for example, such that the pipe deployment vehicle 46 can drive itself to and/or from a pipeline system 10.

In any case, as depicted, a flexible pipe 20, which is formed into a pipe coil 54, is loaded on the vehicle frame 48 of the pipe deployment vehicle 46. In particular, as in the depicted example, in some embodiments, a pipe coil 54 may be disposed on a pipe drum 52. In some such embodiments, the pipe drum 52 may be an independent pipe drum 52. However, in other such embodiments, the pipe drum 52 may be included in a pipe reel that includes reel ends on either side of the pipe drum 52.

Nevertheless it should be appreciated that the depicted example is merely intended to be illustrative and not limiting. In particular, in other embodiments, a pipe coil 54 may be loaded on a pipe deployment vehicle 46 without using a drum, for example, when the pipe deployment vehicle 46 includes a pipe deployment cradle frame that includes rollers on which an outer surface of the pipe coil 54 can rest.

In any case, to facilitate improving pipeline deployment efficiency, in some instances, flexible pipe 20 may be deployed from a pipe coil 54 directly into a pipeline system 10. In particular, in some such instances, only a segment (e.g., section and/or portion) 78 of the flexible pipe 20 may be deployed in the pipeline system 10 at one time. To facilitate deploying a segment 78 of a flexible pipe 20 from a pipe coil 54 into a pipeline system 10, as depicted, a pipe deployment system 44 may generally include a cutting assembly 56, which is implemented and/or operated to facilitate cutting the segment 78 of the flexible pipe 20 off from the remainder (e.g., remaining section and/or portion) of the flexible pipe 20, for example, and secured to the vehicle frame 48 of a pipe deployment vehicle 46. Thus, in some embodiments, a cutting assembly 56 in a pipe deployment system 44 may generally include one or more cutting blades, for example, in addition to one or more actuators that are implemented and/or operated to selectively engage the one or more cutting blades with the tubing 22 of a flexible pipe 20. Accordingly, the pipe deployment system 44 may generally deploy a segment 78 of a flexible pipe 20 from a pipe coil 54 into a pipeline system 10 by unwinding at least the segment 78 of the flexible pipe 20 from the pipe coil 54 and cutting off the segment 78 of the flexible pipe 20 from the remainder of the flexible pipe 20.

However, the flexibility of a flexible pipe 20 generally varies with the temperature of its tubing 22. In particular, the flexibility of a flexible pipe 20 may generally increase as the temperature of its tubing 22 increases. On the other hand, the flexibility of a flexible pipe 20 may generally decrease as the temperature of its tubing 22 decreases. In other words, as the temperature of its tubing 22 decreases, a flexible pipe 20 may exert more resistance to a change in shape. In fact, in some instances, when too cold, the tubing 22 of a flexible pipe 20 may limit the ability to unwind a segment 78 of the flexible pipe 20 from a corresponding pipe coil 54 and, thus, the ability to deploy the segment 78 of flexible pipe 20 directly from the pipe coil 54 into a pipeline system 10.

Accordingly, to facilitate enabling flexible pipe 20 to be deployed directly from a pipe coil 54 into a pipeline system 10 and, thus, improving deployment efficiency of the pipeline system 10, as depicted, the pipe deployment system 44 additionally includes a pipe heating apparatus 58. As depicted, a pipe heating apparatus 58 in a pipe deployment system 44 may generally include a bore device 60, one or more heat sources 62, and one or more heating conduits 64 that connect the bore device 60 and the one or more heat sources 62. In particular, in some embodiments, a heat source 62 in a pipe heating apparatus 58 may be secured to the vehicle frame 48 of a corresponding pipe deployment vehicle 46.

As will be described in more detail below, in some embodiments, a segment 78 of a flexible pipe 20 that is isolated by a bore device 60 in a pipe heating apparatus 58 may be heated using heat produced by the resistance of electrically conductive material due to electrical power being passed therethrough. Accordingly, in such embodiments, a heat source 62 in the pipe heating apparatus 58 may be a heating electrical power source 62, such as a power supply and/or an electrical grid, and a heating conduit 64 connected between the heat source 62 and the bore device 60 may be a heating electrical conduit 64, such as a heat trace cable. Additionally or alternatively, in some embodiments, a segment 78 of a flexible pipe 20 that is isolated by a bore device 60 in a pipe heating apparatus 58 may be heated by supplying heated fluid, such as water ($H_2O$), saltwater, or another heat transfer fluid, to the flexible pipe segment 78.

Thus, in such embodiments, a heat source 62 in the pipe heating apparatus 58 may be a heating fluid source (e.g., pump) 62 and a heating conduit 64 connected between the heat source 62 and the bore device 60 may be a heating fluid conduit 64, such as a hose.

In any case, as in the depicted example, in some embodiments, a pipe heating apparatus 58 may additionally include a control sub-system 66, for example, in addition to one or more sensors 67, such as a temperature sensor 67, a pressure sensor 67, and/or a power (e.g., voltage and/or current) sensor 67. In particular, in some such embodiments, a control sub-system 66 in a pipe heating apparatus 58 may generally control operation of the pipe heating apparatus 58. However, it should again be appreciated that the depicted example is merely intended to be illustrative and not limiting. In particular, in other embodiments, a pipe heating apparatus 58 may be implemented to be manually controlled and, thus, not include a control sub-system 66.

To facilitate controlling operation of a pipe heating apparatus 58, as in the depicted example, a control sub-system 66 in the pipe heating apparatus 58 may generally include one or more processors 68, memory 70, and one or more input/output (I/O) devices 72. In some embodiments, the memory 70 in the control sub-system 66 may include one or more tangible, non-transitory, computer-readable media that are implemented and/or operated to store data and/or executable instructions. For example, the memory 70 may store sensor data based at least in part on one or more sensor signals 74 received from a sensor 67. As such, in some embodiments, the memory 70 may include volatile memory, such as random-access memory (RAM), and/or non-volatile memory, such as read-only memory (ROM), flash memory, a solid-state drive (SSD), a hard disk drive (HDD), or any combination thereof.

Additionally, in some embodiments, a processor 68 in the control sub-system 66 may include processing circuitry that is implemented and/or operated to process data and/or to execute instructions stored in memory 70. In other words, in some such embodiments, a processor 68 in the control sub-system 66 may include one or more general purpose microprocessors, one or more application specific integrated circuits (ASICs), one or more field programmable gate arrays (FPGAs), or any combination thereof. For example, a processor 68 in the control sub-system 66 may process sensor data stored in memory 70 to facilitate determining the temperature of the tubing 22 of a flexible pipe 20.

Additionally or alternatively, a processor 68 in the control sub-system 66 may execute instructions stored in memory 70 to determine one or more control (e.g., command) signals 76 that instruct the pipe heating apparatus 58 to perform corresponding control actions. For example, the control sub-system 66 may determine a control signal 76 that instructs a heat source 62 to heat a heating conduit 64 connected thereto. As another example, the control sub-system 66 may determine a control signal 76 that instructs a sensor 67 to return one or more sensor signals 74 indicative of a fluid parameter, such as fluid pressure or fluid temperature, of fluid encountered by the sensor 67 and/or an electrical parameter, such as voltage and/or current, of electrical power encountered by the sensor 67.

To enable communication outside of the control sub-system 66, in some embodiments, the I/O devices 72 of the control sub-system 66 may include one or more input/output (I/O) ports (e.g., terminals). Additionally, in some embodiments, the I/O devices 72 of the control sub-system 66 may include one or more user output devices, such as an electronic display, which is implemented and/or operated to display a graphical user interface (GUI) that provides a visual representation of the temperature of the tubing 22 of a flexible pipe 20. Furthermore, to enable user interaction with the pipe heating apparatus 58, in some embodiments, the I/O devices 72 of the control sub-system 66 may include one or more user input devices, such as a hard button, a soft button, a keyboard, a mouse, and/or the like.

In any case, since only a segment 78 of a flexible pipe 20 may be deployed from a pipe coil 54 into a pipeline system 10 at one time, a bore device 60 in a pipe heating apparatus 58 may be inserted into the pipe bore 32 of the flexible pipe 20 via an open end 80 of the flexible pipe 20 and moved along the pipe bore 32 to facilitate isolating the segment 78 of the flexible pipe 20 from a remainder (e.g., remaining section and/or portion) of the flexible pipe for heating, for example, to facilitate reducing power consumption resulting from operation of the pipe heating apparatus 58 and, thus, improving pipe heating efficiency. In particular, in some embodiments, a bore device 60 in a pipe heating apparatus 58 may be implemented to seal an upstream region 86 of the pipe bore 32 in a flexible pipe 20 behind the bore device 60 from a downstream region 88 of the pipe bore 32 in front of the bore device 60. Thus, in some such embodiments, the bore device 60 may be moved along the pipe bore 32 at least in part by injecting fluid into the pipe bore 32 to pressurize an upstream region 86 of the pipe bore 32 behind the bore device 60.

Figure 5:
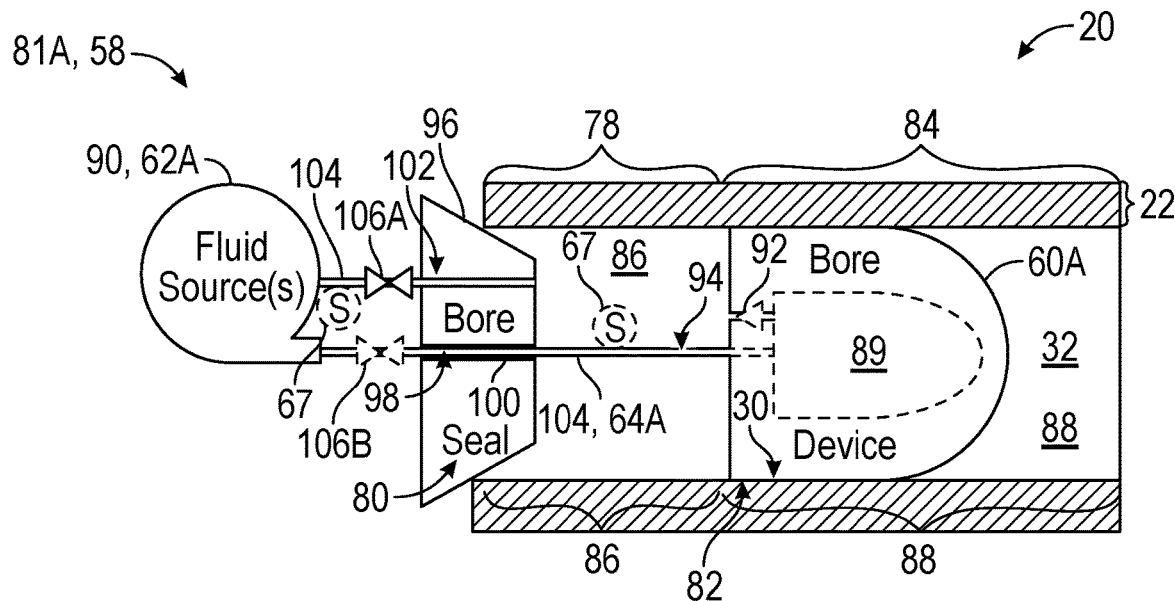
FIG. 5 is an axial cross-section profile of an example of a portion of the pipe heating apparatus of FIG. 4, in accordance with an embodiment of the present disclosure.

To help illustrate, an example of a portion 81A of a pipe heating apparatus 58, which includes a bore device 60—namely a sealing bore device 60A, is shown in FIG. 5. As depicted, the sealing bore device 60A is disposed within the pipe bore 32 of a flexible pipe 20 such that the outer surface 82 of the sealing bore device 60A is engaged with the inner surface 30 of the tubing 22 of the flexible pipe 20. As such, the sealing bore device 60A may facilitate sealing an upstream region 86 of the pipe bore 32 and, thus, a (e.g., upstream) segment 78 of the flexible pipe 20 from a downstream region 88 of the pipe bore 32 and, thus, a remainder (e.g., downstream segment and/or remaining segment) 84 of the flexible pipe 20.

To facilitate inserting a sealing bore device 60A into the pipe bore 32 of a flexible pipe 20 and, subsequently, sealing a segment 78 of the flexible pipe 20, in some embodiments, the sealing bore device 60A may include an internal fluid cavity 89. In particular, in such embodiments, contracting the internal fluid cavity 89 of a sealing bore device 60A radially inward may cause the outer surface 82 of the sealing bore device 60A to contract radially inward and expanding the internal fluid cavity 89 of the sealing bore device 60A radially outward may cause the outer surface 82 of the sealing bore device 60A to expand radially outward. Additionally, in such embodiments, supplying (e.g., injecting) fluid to the internal fluid cavity 89 of a sealing bore device 60A may cause the internal fluid cavity 89 to expand radially outward while extracting (e.g., releasing) fluid from the internal fluid cavity 89 of the sealing bore device 60A may cause the internal fluid cavity 89 to contract radially inward.

Accordingly, to facilitate controlling expansion and/or contraction of a sealing bore device 60A, in some embodiments, a fluid source (e.g., pump) 90 may be fluidly connected to the internal fluid cavity 89 in a sealing bore device 60A via one or more fluid conduits 104, such as a hose. Additionally, to facilitate moving the sealing bore device 60A within the pipe bore 32 of a flexible pipe 20 and/or heating a segment 78 of a flexible pipe 20, in some embodiments, the sealing bore device 60A may include a relief (e.g., one-way) valve 92, which is fluidly connected between the internal fluid cavity 89 of the sealing bore device 60A and the upstream region 86 of the pipe bore 32 behind the sealing bore device 60A. In particular, in such embodiments, the relief valve 92 may operate to release fluid from the internal fluid cavity 89 of the sealing bore device 60A to the upstream region 86 of the pipe bore 32 once fluid pressure within the internal fluid cavity 89 of the sealing bore device 60A exceeds an associated fluid pressure threshold.

However, it should be appreciated that the depicted example is merely intended to be illustrative and not limiting. In particular, in other embodiments, an internal fluid cavity 89 in a sealing bore device 60A may open to an upstream region 86 of a pipe bore 32 behind the sealing bore device 60A while a relief valve 92 of the sealing bore device 60A is fluidly connected between the internal fluid cavity 89 and a fluid conduit 104 (e.g., heating fluid conduit 64A) that is connected to the sealing bore device 60A. Alternatively, in other embodiments, a sealing bore device 60A in a pipe heating apparatus 58 may not include an internal fluid cavity 89 or a relief valve 92. To facilitate fluid flow between a fluid source 90 and the pipe bore 32 in a flexible pipe 20 and, thus, movement of a sealing bore device 60 along the pipe bore 32 and/or heating of a segment 78 of the flexible pipe 20 that is isolated via the sealing bore device 60, in such embodiments, a fluid conduit 104 (e.g., heating fluid conduit 64A) that is connected to the sealing bore device 60A may include a conduit fluid port 94 that opens therethrough to the upstream region 86 of the pipe bore 32 behind the sealing bore device 60A.

To facilitate reducing implementation-associated cost (e.g., physical footprint and/or component count) of a pipe heating apparatus 58, in some embodiments, the same fluid source 90 and the same one or more fluid conduits 104 may be used to supply fluid to the pipe bore 32 in a flexible pipe 20 to facilitate moving a sealing bore device 60A within the pipe bore 32 as well to facilitate heating the tubing 22 of the flexible pipe 20. In other words, in such embodiments, a fluid source 90 in a pipe heating apparatus 58 may be a heat source 62—namely a heating fluid source (e.g., pump) 62A—and a fluid conduit 104 connected between the fluid source 90 and the sealing bore device 60A may be a heating fluid conduit 64A, such as a hose. To facilitate producing heated fluid, in some embodiments, a heating fluid source 62 in a pipe heating apparatus 58 may include one or more heating elements.

Furthermore, to facilitate holding fluid within the pipe bore 32 of a flexible pipe 20, as depicted, the portion 81A of the pipe heating apparatus 58 additionally includes a bore seal 96. In particular, in the depicted example, the bore seal 96 is a plug. As such, when inserted into the pipe bore 32 of a flexible pipe 20, the bore seal 96 may facilitate sealing an open end 80 of the flexible pipe 20 and, thus, the pipe bore 32. However, it should again be appreciated that the depicted example is merely intended to be illustrative and not limiting. In particular, in other embodiments, a bore seal 96 in a pipe heating apparatus 58 may be an end cap, which is secured circumferentially around the tubing 22 of a flexible pipe 20 such that it covers and, thus, facilitates sealing an open end 80 of the flexible pipe 20 and, thus, the pipe bore 32 of the flexible pipe 20.

In any case, to enable the sealing bore device 60A to be moved along the pipe bore 32, as depicted, the bore seal 96 may include a conduit opening 98 that opens therethrough to enable a fluid conduit 104 (e.g., heating fluid conduit 64A), which is connected to the sealing bore device 60A, to pass though the bore seal 96. To facilitate reducing the likelihood of fluid inadvertently leaking past the bore seal 96 via its conduit opening 98, the bore seal 96 may include a conduit seal 100 disposed within the conduit opening 98, for example, such that the conduit seal 100 can be compressed between a fluid conduit 104 disposed with the conduit opening 98 and the bore seal 96.

Additionally, to facilitate circulating fluid though a segment 78 of a flexible pipe 20 and, thus, improving heating efficiency and/or controlling whether fluid supplied to the pipe bore 32 of the flexible pipe 20 is used to move a sealing bore device 60 within the pipe bore 32 or merely to heat the flexible pipe segment 78, as depicted, the bore seal 96 may include a seal fluid port 102 that opens therethrough to an upstream region 86 of the pipe bore 32 behind the sealing bore device 60A. In particular, a (e.g., first and/or return) fluid valve 106A may be fluidly connected between the seal fluid port 102 of the bore seal 96 and a fluid source 90 via one or more fluid conduits 104 (e.g., heating fluid conduits 64A), such as a hose. More specifically, in some embodiments, the fluid valve 106A and the seal fluid port 102 of the bore seal 96 may be fluidly connected to a fluid return port of the fluid source 90 while a fluid conduit 104 (e.g., heating fluid conduit 64A), which is fluidly connected to the sealing bore device 60A, may be fluidly connected to a fluid supply port of the fluid source 90.

In other words, in such embodiments, the fluid source 90 may operate to supply fluid to an upstream region 86 of a pipe bore 32 behind the sealing bore device 60A via a fluid conduit 104 (e.g., heating fluid conduit 64A) that is fluidly connected to the sealing bore device 60A and selectively receive fluid from the upstream region 86 of the pipe bore 32 based at least part on the activation state of the fluid valve 106A. In particular, in such embodiments, maintaining the fluid valve 106A in a closed state while the fluid source 90 is supplying fluid to the upstream region 86 of a pipe bore 32 behind the sealing bore device 60A may facilitate pressuring the upstream region 86 of the pipe bore 32 and, thus, moving the sealing bore device 60A along the pipe bore 32, for example, to facilitate isolating a segment 78 of a corresponding flexible pipe 20 that is to be disposed in a pipeline system 10 for heating. On the other hand, in such embodiments, maintaining the fluid valve 106A in an open state while the fluid source is supplying fluid to the upstream region 86 of a pipe bore 32 behind the sealing bore device 60A may facilitate circulating fluid within and, thus, heating a corresponding segment 78 of a flexible pipe 20.

However, in other embodiments, the seal fluid port 102 of the bore seal 96 may be fluidly connected to a fluid supply port of a fluid source 90 while a fluid conduit 104 (e.g., heating fluid conduit 64A), which is fluidly connected to a sealing bore device 60A, may be fluidly connected to a fluid return port of the fluid source 90. In other words, in such embodiments, the fluid source 90 may operate to selectively supply fluid to an upstream region 86 of a pipe bore 32 behind the sealing bore device 60A via the seal fluid port 102 of the bore seal 96 (e.g., based at least in part on an activation state of the fluid valve 106A) and receive fluid from the upstream region 86 of the pipe bore 32 via a fluid conduit 104 that is connected to the sealing bore device 60A and disposed within the upstream region 86 of the pipe bore 32. To facilitate selectively receiving fluid from the upstream region 86 of the pipe bore, in such embodiments, a (e.g., second and/or another) fluid valve 106B may be fluidly connected between the fluid source 90 and the fluid conduit 104.

In fact, in some embodiments, connecting one or more fluid valves 106 between the fluid supply port of a fluid source 90 and an upstream region 86 of a pipe bore 32 in a flexible pipe 20 that is isolated by a bore sealing device 60A as well as between the fluid return port of the fluid source 90 and the upstream region 86 of the pipe bore 32 may enable selectively locking fluid with a corresponding segment 78 of the flexible pipe 20, for example, to facilitate maintaining temperature of the tubing 22 in the flexible pipe segment 78. In particular, in some embodiments, the fluid valves 106 may be maintained in opened states to enable fluid to be circulated through the segment 78 of the flexible pipe 20 (e.g., until a target temperature of the tubing 22 of the flexible pipe segment 78 is reached) and, subsequently, transitioned from the opened states to closed states to hold fluid within the segment 78 of the flexible pipe 20, for example, to facilitate reducing the rate at which the tubing 22 of the flexible pipe segment 78 cools. In fact, in some such embodiments, a pipe heating apparatus 58 may circulate fluid though a segment 78 of a flexible pipe 20 while a corresponding pipe deployment vehicle 46 is stationary and hold fluid within the segment 78 of the flexible pipe 20 while the pipe deployment vehicle 46 is in motion (e.g., driving and/or being towed).

In any case, as described above, to facilitate controlling the temperature of a segment 78 of a flexible pipe 20 that is isolated by a bore device 60, in some embodiments, a pipe heating apparatus 58 may include one or more sensors 67, such as a temperature sensor 67 and/or a pressure sensor 67. In particular, in some such embodiments, one or more temperature sensors 67 may be secured to a heating conduit 64 (e.g., heating fluid conduit 64A) that is disposed within an upstream region 86 of a pipe bore 32 in a flexible pipe 20, fluidly connected to a fluid supply port of a fluid source 90, and/or fluidly connected to a fluid return port of the fluid source 90 to enable the pipe heating apparatus 58 to determine the temperature of fluid present within the upstream region 86 of the pipe bore 32 and/or a fluid temperature change resulting from fluid circulation through the upstream region 86 of the pipe bore 32 and, thus, to indirectly determine the temperature of the tubing 22 in a corresponding segment 78 of the flexible pipe 20. Additionally or alternatively, a pressure sensor 67 may be secured to a fluid conduit 104 (e.g., heating fluid conduit 64A) that is disposed within an upstream region 86 of the pipe bore 32 in a flexible pipe 20 to enable the pipe heating apparatus 58 to determine fluid pressure within the upstream region 86 of the pipe bore 32 and, thus, control movement of a sealing bore device 60A within the pipe bore 32 accordingly.

In any case, as described above, to facilitate reducing power consumption used for pipe heating and, thus, improving pipe heating efficiency, a bore device 60 may be moved within the pipe bore 32 of a flexible pipe 20 to facilitate isolating a segment 78 of the flexible pipe 20 (e.g., that is to be deployed in a pipeline system) for heating. To facilitate moving a bore device 60 to appropriately isolate a segment 78 of a flexible pipe 20, in some embodiments, a heating conduit 64 that is connected to the bore device 60 may include markings on its outer surface to facilitate determining how far the bore device 60 has been inserted into the pipe bore 32 of the flexible pipe 20. For example, in some such embodiments, an operator (e.g., user and/or service technician) of a pipe heating apparatus 58 may determine that the bore device 60 has reached a target position in the pipe bore 32 of a flexible pipe 20 to appropriately isolate a segment 78 of the flexible pipe 20 when a corresponding marking on the heating conduit 64 aligns with an end of a corresponding bore seal 96 and/or an end of the tubing 22 of the flexible pipe 20. Additionally or alternatively, a pipe heating apparatus 58 may determine the position of a bore device 60 in the pipe bore 32 of a flexible pipe 20 at least in part by explicitly tracking the length of heating conduits 64 inserted into the pipe bore 32 behind the bore device 60, for example, via a sensor 67 on a spool of the heating conduit 64.

Moreover, to facilitate reducing power consumption used for pipe heating and, thus, improving pipe heating efficiency, in some embodiments, different lengthed heating conduits 64 and/or different numbers of heating conduits 64 may be connected between a heat source 62 and a bore device 60 based at least in part on the length of a segment 78 of a flexible pipe 20 that is to be heated and/or deployed in a pipeline system 10. For example, in some such embodiments, a longer heating conduit 64 may be connected between the heat source 62 and the bore device 60 when the length of the flexible pipe segment 78 is longer while a shorter heating conduit 64 may be connected between the heat source 62 and the bore device 60 when the length of the flexible pipe segment 78 is shorter. Additionally or alternatively, more heating conduits 64 may be connected between the heat source 62 and the bore device 60 when the length of the flexible pipe segment 78 is longer while fewer heating conduits may be connected between the heat source 62 and the bore device 60 when the length of the flexible pipe segment 78 is shorter. In any case, in this manner, a pipe heating apparatus 58 may be implemented and/or operated to facilitate heating a segment 78 of a flexible pipe 20, which, at least in some instances, may facilitate improving deployment efficiency of a pipeline system 10 in which the flexible pipe segment 78 is to be deployed, for example, by enabling the flexible pipe segment 78 to be unwound from a corresponding pipe coil 54, cut off from the remainder 84 of the flexible pipe 20, and deployed directly in the pipeline system 10.

However, it should again be appreciated that the depicted example is merely intended to be illustrative and not limiting. In particular, as mentioned above, in other embodiments, a pipe heating apparatus 58 may heat a segment 78 of a flexible pipe 20 at least in part using heat produced by the resistance of electrically conductive material due to electrical power being passed therethrough and, thus, a heat source 62 in the pipe heating apparatus 58 may be a heating electrical power source, such as a power supply or an electrical grid, and a heating conduit 64 in the pipe heating apparatus 58 may be a heating electrical conduit 64, such as a heat trace cable. Additionally or alternatively, in other embodiments, a bore device 60 in a pipe heating apparatus 58 may be self-propelled and, thus, move itself within a pipe bore 32, for example, instead of being pushed along the pipe bore 32 via fluid.

Figure 6:
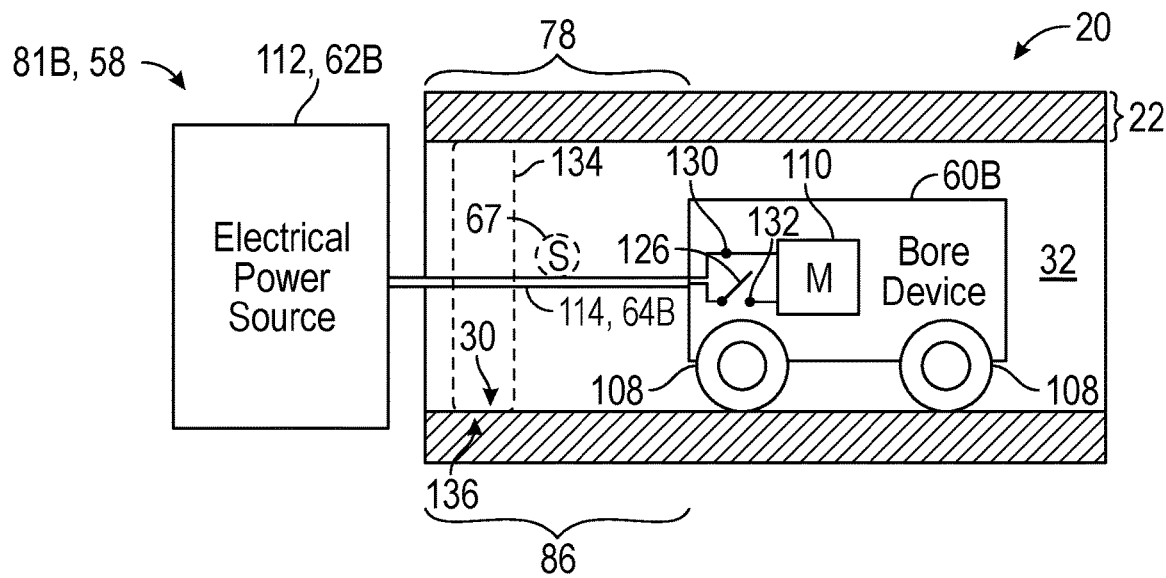
FIG. 6 is an axial cross-section profile of another example of a portion of the pipe heating apparatus of FIG. 4, in accordance with an embodiment of the present disclosure.

To help illustrate, another example of a portion 81B of a pipe heating apparatus 58, which includes a bore device 60—namely a crawler bore device 60B—is shown in FIG. 6. As in the depicted example, a crawler bore device 60B in a pipe heating apparatus 58 may generally include one or more device wheels 108 and an electric motor 110, which is connected to the one or more device wheels 108 and, thus, the crawler bore device 60B may move itself when electrical power is supplied to the electric motor 110. To facilitate supplying electrical power to a crawler bore device 60B, the portion 81B of the pipe heating apparatus 58 includes an electrical power source 112, such as a power supply and/or a power grid, and one or more electrical conduits 114, such as a wire or cable, which electrically connect the electrical power source 112 and the crawler bore device 60B.

As described above, in some embodiments, a pipe heating apparatus 58 may heat a segment 78 of a flexible pipe 20 at least in part using heat produced by the resistance of electrically conductive material due to electrical power being passed therethrough. In fact, to facilitate reducing implementation-associated cost (e.g., physical footprint and/or component count) of a pipe heating apparatus 58, in some such embodiments, the same electrical power source 112 and the same one or more electrical conduits 114 may be used to supply electrical power to move a crawler bore device 60B as well as to heat the tubing 22 of a flexible pipe 20. In other words, in such embodiments, a heat source 62 in the pipe heating apparatus 58 may be a heating electrical power source 62B and a heating conduit 64 in the pipe heating apparatus 58 may be a heating electrical conduit 64B, such as a heat trace cable.

Figure 7:
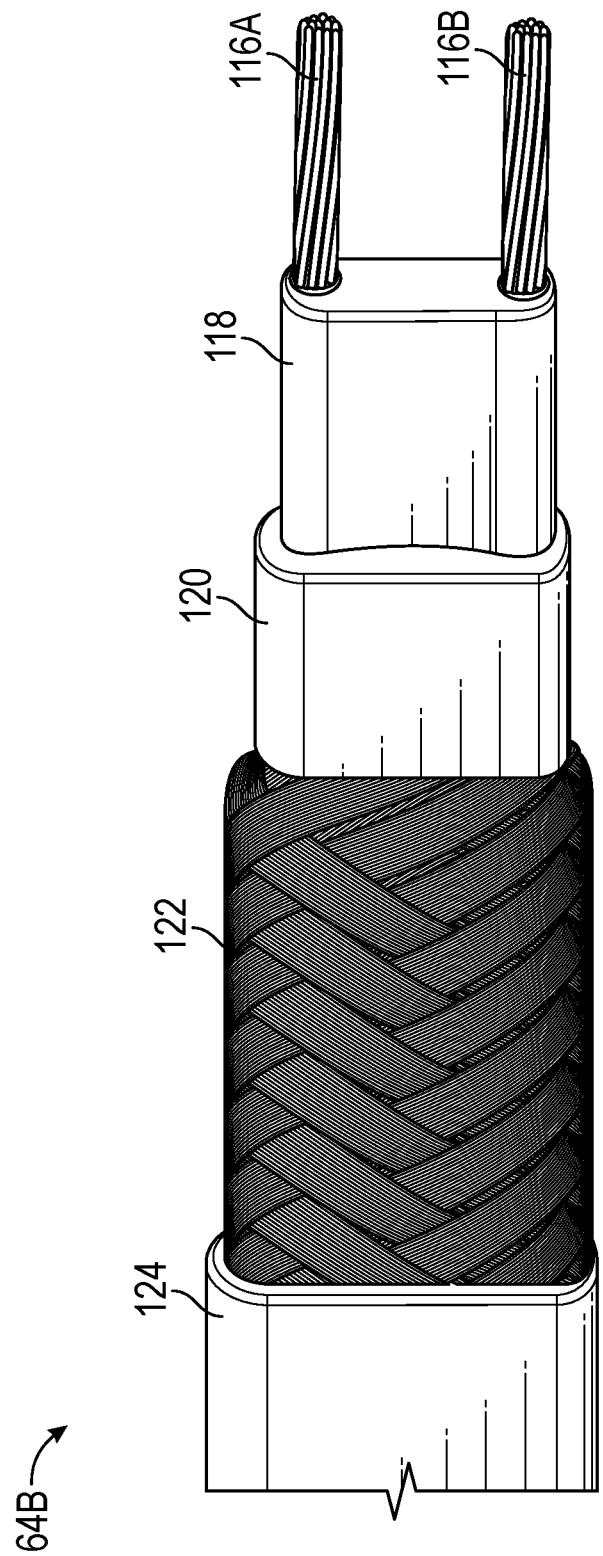
FIG. 7 is a partially cutback view of an example of a heating electrical conduit that may be included in the portion of the pipe heating apparatus of FIG. 6, in accordance with an embodiment of the present disclosure.

To help illustrate, an example of a heating electrical conduit 64B, which may be included in a pipe heating apparatus 58, is shown in FIG. 7. As depicted, the heating electrical conduit 64B generally includes bus wires 116—namely a positive (e.g., first) bus wire 116A and a negative (e.g., second) bus wire 116B, a conductive core 118 formed around the bus wires 116, an inner insulation layer 120 formed around the conductive core 118, and a braided metallic layer 122 formed around the inner insulation layer 120. In particular, the inner insulation layer 120 may generally electrically isolate the conductive core 118 from the braided metallic layer 122 while the braided metallic layer 122 grounds the heating electrical conduit 64B.

As in the depicted example, in some embodiments, a heating electrical conduit 64B may additionally include an outer insulation layer 124 formed around its braided metallic layer 122, for example, to facilitate protecting the heating electrical conduit 64B from moisture and/or abrasion. However, it should be appreciated that the depicted example is merely intended to be illustrative and not limiting. In particular, in other embodiments, a heating electrical conduit 64B, such as heat trace cable, in a pipe heating apparatus 58 may not include an outer insulation layer 124, for example, when its braided metallic layer 122 is expected to sufficiently protect the heating electrical conduit 64 from moisture and/or abrasion.

In any case, the conductive core 118 in a heating electrical conduit 64B may generally enable electrical power to flow therethrough between corresponding bus wires 116, thereby producing heat due to its resistance. In fact, in some embodiments, the conductive core 118 in a heating electrical conduit 64B may vary its resistance with its temperature, thereby enabling the heating electrical conduit 64B to self-regulate the amount of heat produced. In particular, in such embodiments, the resistance of the conductive core 118 may generally decrease as its temperature decreases, thereby enabling more electrical power to flow between the bus wires 116 through the conductive core 118 and, thus, the heating electrical conduit 64B to produce more heat. On the other hand, the resistance of the conductive core 118 may generally increase as its temperature increases, thereby enabling less electrical power to flow between the bus wires 116 through the conductive core 118 and, thus, the heating electrical conduit 64B to produce less heat.

Returning to FIG. 6, to facilitate selecting between using electrical power supplied to a heating electrical conduit 64B to move a crawler bore device 60B or merely to heat a flexible pipe 20, in some embodiments, the crawler bore device 60B may include a switch 126 electrically connected between the heating electrical conduit 64B and its electric motor 110. In particular, to facilitate using electrical power to move (e.g., drive) the crawler bore device 60B, the switch 126 may be electrically connected to a motor terminal 132, which is electrically connected to the electric motor 110, thereby enabling electrical power to be supplied from an electrical power source 112 to the electric motor 110. On the other hand, to facilitate using electrical power merely to heat a flexible pipe 20, the switch 126 may be electrically connected to a bypass terminal 130, which bypasses the electric motor 110 in the crawler bore device 60B.

As described above, to facilitate controlling the temperature of a segment 78 of a flexible pipe 20 that is isolated by a bore device 60, in some embodiments, a pipe heating apparatus 58 may include one or more sensors 67, such as a temperature sensor 67 and/or a power (e.g., voltage and/or current) sensor 67. In particular, in some such embodiments, a temperature sensor 67 may be secured to a heating conduit 64 (e.g., heating electrical conduit 64B) that is disposed within an upstream region 86 of a pipe bore 32 in a flexible pipe 20 to enable the pipe heating apparatus 58 to determine the temperature within the upstream region 86 of the pipe bore 32 and, thus, to indirectly determine the temperature of the tubing 22 of the flexible pipe 20 in a corresponding segment 78 of the flexible pipe 20. Additionally or alternatively, a power sensor 67 may be electrically connected between a heating electrical power source 62B and a bore device 60 to enable the pipe heating apparatus 58 to determine voltage and/or current of electrical power flowing through a corresponding heating electrical conduit 64B that is disposed within an upstream region 86 of a pipe bore 32 in a flexible pipe 20, thereby enabling the pipe heating apparatus 58 to indirectly determine the temperature of the heating electrical conduit 64B and, thus, the temperature of the tubing 22 in a corresponding segment 78 of the flexible pipe 20

In any case, in some instances, a heating conduit 64 disposed with a pipe bore 32 of a flexible pipe 20 may tend to move to one side of the pipe bore 32, for example, instead of being substantially central within the pipe bore 32. In other words, in such instances, the heating conduit 64 may tend to heat one side of the flexible pipe 20 more than an opposite side of the flexible pipe 20. Accordingly, as in the depicted example, to facilitate improving pipe heating uniformity, in some embodiments, a pipe heating apparatus 58 may additionally include a centralizer 134, which is secured circumferentially around a heating conduit 64. In particular, in some such embodiments, a centralizer 134 in a pipe heating apparatus 58 may be a foam centralizer 134 or an inflatable (e.g., pneumatic) centralizer 134, such as an inflatable packer.

In any case, as in the depicted example, a centralizer 134 in a pipe heating apparatus 58 may be disposed within the pipe bore 32 of a flexible pipe 20 such that at least a portion of its outer surface 136 rests against (e.g., directly abuts) the inner surface 30 of the tubing 22 of the flexible pipe 20. In this manner, the centralizer 134 may facilitate holding a corresponding heating conduit 64 more central within the pipe bore 32 and, thus, improving the uniformity with which the tubing 22 of the flexible pipe 20 is heated.

However, it should be appreciated that the depicted example is merely intended to be illustrative and not limiting. In particular, in other embodiments, a pipe heating apparatus 58 may include multiple centralizers 134 disposed circumferentially around a heating conduit 64. Alternatively, in other embodiments, a pipe heating apparatus 58 may not include a centralizer 134. Furthermore, in other embodiments, a bore device 60 in a pipe heating apparatus 58 may be moved within a pipe bore 32 of a flexible pipe 20 at least in part by pulling the bore device 60 from an open end 80 of the flexible pipe 20, for example, instead of self-propelling the bore device 60 or pushing the bore device 60 using pressurized fluid.

Figure 8:
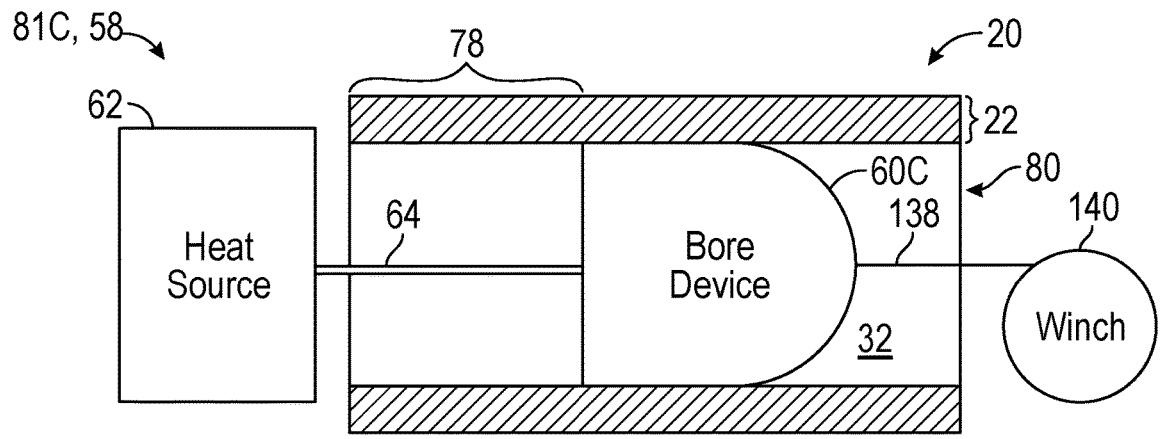
FIG. 8 is an axial cross-section profile of a further example of a portion of the pipe heating apparatus of FIG. 4, in accordance with an embodiment of the present disclosure.

To help illustrate, a further example of a portion 81C of a pipe heating apparatus 58 is shown in FIG. 8. Similar to FIGS. 5 and 6, the portion 81C of the pipe heating apparatus 58 in FIG. 8 generally includes a bore device 60C, a heat source 62, and one or more heating conduits 64 that connect the bore device 60C and the heat source 62. In particular, in some embodiments, the bore device 60C of FIG. 8 may be a sealing bore device 60A similar to FIG. 5, the heat source 62 of FIG. 8 may be a heating fluid source 62A similar to FIG. 5, a heating conduit 64 of FIG. 8 may be a heating fluid conduit 64A similar to FIG. 5, or any combination thereof. Additionally or alternatively, the heat source 62 of FIG. 8 may be a heating electrical power source 62B similar to FIG. 6, a heating conduit 64 of FIG. 8 may be a heating electrical conduit 64B similar to FIG. 6, or both.

In any case, as depicted in FIG. 8, the portion 81C of the pipe heating apparatus 58 additionally includes a pulling cable 138, which is wrapped on a winch 140 and secured to the bore device 60C opposite the one or more heating conduits 64. In particular, to facilitate moving the bore device 60C through the pipe bore 32 of a flexible pipe 20, in such embodiments, the pulling cable 138 may be run through the pipe bore 32 and secured to the bore device 60C. After the pulling cable 138 is secured to the bore device 60C, the winch 140 may be operated to retract the pulling cable 138, for example, to facilitate moving the bore device 60C such that the bore device 60C isolates a segment 78 of the flexible pipe 20 for heating and/or removing the bore device 60C from the pipe bore 32 after the tubing 22 of the flexible pipe 20 is sufficiently heated.

However, it should be appreciated that the depicted example is merely intended to be illustrative and not limiting. In particular, in other embodiments, a pulling cable 138, which is wrapped on a winch 140, may be secured to a bore device 60 on the same side as a heating conduit 64 and, thus, the winch 140 may be operated to pull the bore device 60 back out of the pipe bore 32 in a flexible pipe 20, for example, after the tubing 22 of the flexible pipe 20 is sufficiently heated. Alternatively, in other embodiments, a heating conduit 64 that is connected to a bore device 60 may be wound (e.g., wrapped) on a winch 140 and, thus, the winch 140 may be operated to retract the heating conduit 64 to pull the bore device 60 back out of the pipe bore 32 in a flexible pipe 20, for example, after the tubing 22 of the flexible pipe 20 is sufficiently heated. Moreover, in other embodiments, a pipe heating apparatus 58 may include a heating fluid source 62A as well as a heating electrical power source 62B. Thus, to facilitate heating the tubing 22 of a flexible pipe 20, in such embodiments, the pipe heating apparatus 58 may additionally include a heating fluid conduit 64A, such as a hose, connected between the heating fluid source 62A and a bore device 60 as well as a heating electrical conduit 64B, such as a heat trace cable, connected between the heating electrical power source 62B and the bore device 60.

Figure 9:
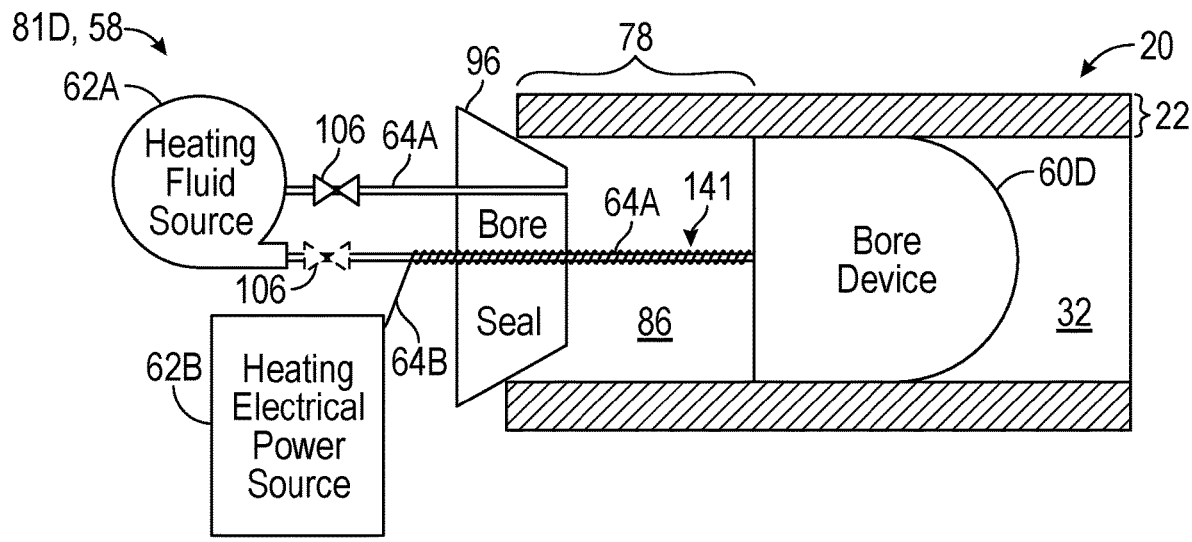
FIG. 9 is an axial cross-section profile of another example of a portion of the pipe heating apparatus of FIG. 4, in accordance with an embodiment of the present disclosure.

To help illustrate, another example of a portion 81D of a pipe heating apparatus 58 is shown in FIG. 9. Similar to FIG. 5, as depicted in FIG. 9, the portion 81D of the pipe heating apparatus 58 generally includes a heating fluid source 62A, a bore seal 96, a bore device 60D, and one or more heating fluid conduits 64A, such as a hose, which fluidly connect the heating fluid source 62A and an upstream region 86 of a pipe bore 32 behind the bore device 60D. In fact, in some embodiments, the bore device 60D of FIG. 9 may be a sealing bore device 60A similar to FIG. 5, the bore seal 96 of FIG. 9 may generally match the bore seal 96 of FIG. 5, or both.

However, similar to FIG. 6, the portion 81D of the pipe heating apparatus 58 additionally includes a heating electrical power source 62B and one or more heating electrical conduits 64B, such as a heat trace cable, which connect the bore device 60D and the heating electrical power source 62B. In particular, as depicted, a heating electrical conduit 64B and a heating fluid conduit 64A may be wound (e.g., wrapped and/or twisted) around one another to form a conduit bundle 141 and, thus, concurrently disposed within an upstream region 86 of a pipe bore 32 behind the bore device 60D. In other words, in such embodiments, a pipe heating apparatus 58 may concurrently heat a segment 78 of a flexible pipe 20 that is isolated via a bore device 60 using fluid that is supplied to an upstream region 86 of a pipe bore 32 in the flexible pipe 20 via the heating fluid conduit 64A as well as heat produced by the heating electrical conduit 64B due to electrical power being flowed therethrough, which, at least in some instances, may facilitate improving pipe heating efficiency, for example, by reducing the duration it takes to sufficiently heat the segment 78 of the flexible pipe 20.

As described above, in some embodiments, a pipe heating apparatus 58 may include fluid valves 106 connected between a heating fluid source 62A and an upstream region 86 of the pipe bore 32 in a flexible pipe 20 behind a bore device 60 to facilitate selectively circulating fluid, such as liquid, through the upstream region 86 of the pipe bore 32 and selectively holding (e.g., locking in) fluid within the upstream region 86 of the pipe bore 32, for example, such that fluid is circulated through the upstream region 86 of the pipe bore 32 while a corresponding pipe deployment vehicle 46 is stationary and fluid is held in the upstream region 86 of the pipe bore 32 while the pipe deployment vehicle 46 is in motion. Additionally, as described above, a pipe heating apparatus 58 may supply electrical power to a heating electrical conduit 64B disposed within an upstream region 86 of the pipe bore 32 in a flexible pipe 20 to facilitate transferring heat from the heating electrical conduit 64B to a corresponding segment 78 of the flexible pipe tubing 22. Since liquid may provide better heat transfer as compared to air, in some embodiments, a pipe heating apparatus 58 may supply electrical power to a heating electrical conduit 64B disposed within an upstream region 86 of a pipe bore 32 while liquid is present within the upstream region 86 of the pipe bore 32 to facilitate improving pipe heating efficiency.

In other words, to facilitate improving pipe heating efficiency, in some such embodiments, a pipe heating apparatus 58 may supply electrical power to a heating electrical conduit 64B disposed within an upstream region 86 of the pipe bore 32 in a flexible pipe 20 at least while the pipe heating apparatus 58 is circulating liquid through the upstream region 86 of the pipe bore 32. Additionally or alternatively, in some such embodiments, a pipe heating apparatus 58 may supply electrical power to a heating electrical conduit 64B disposed within an upstream region 86 of the pipe bore 32 in a flexible pipe 20 at least while the pipe heating apparatus 58 is holding liquid within the upstream region 86 of the pipe bore 32. In fact, in such embodiments, supplying electrical power to a heating electrical conduit 64B disposed within an upstream region 86 of the pipe bore 32 in a flexible pipe 20 while the pipe heating apparatus 58 is holding liquid within the upstream region 86 of the pipe bore 32 may facilitate replenishing the heat of the liquid held in the upstream region 86 of the pipe bore 32, for example, to facilitate improving pipe heating efficiency while a corresponding pipe deployment vehicle 46 is in motion. In any case, in this manner, a pipe heating apparatus 58 may be implemented to facilitate isolating and heating a segment 78 of a flexible pipe 20, which, at least in some instances, may facilitate improving deployment efficiency of a pipeline system 10 in which the flexible pipe segment 78 is to be deployed, for example, by enabling the flexible pipe segment 78 to be deployed from a pipe coil 54 directly into the pipeline system 10.

Figure 10:
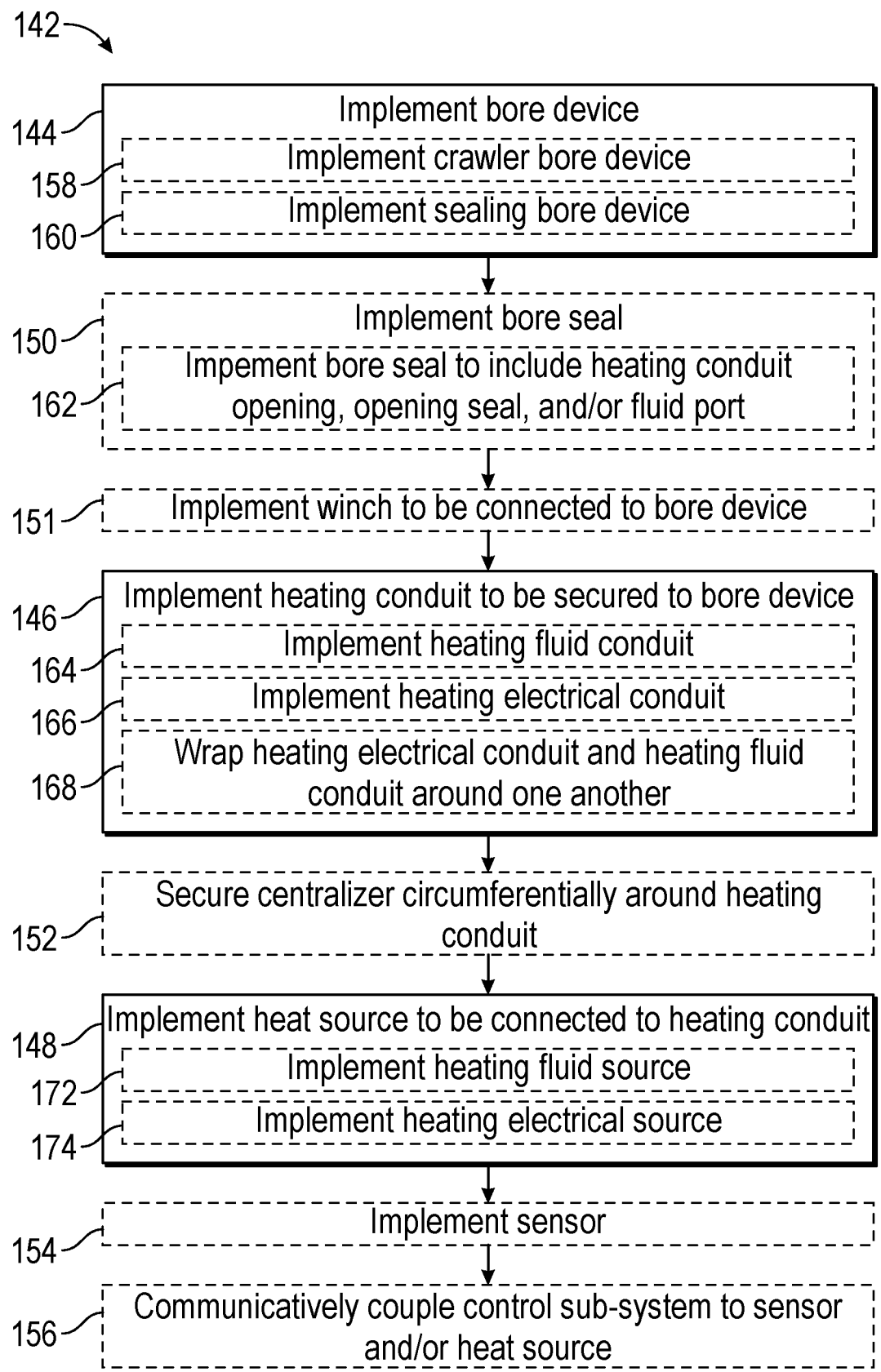
FIG. 10 is a flow diagram of an example of a process for implementing (e.g., manufacturing) a pipe heating apparatus, in accordance with an embodiment of the present disclosure.

To help further illustrate, an example of a process 142 for implementing (e.g., manufacturing) a pipe heating apparatus 58 is described in FIG. 10. Generally, the process 142 includes implementing a bore device (process block 144). Additionally, the process 142 generally includes implementing a heating conduit to be secured to the bore device (process block 146) and implementing a heat source to be connected to the heating conduit (process block 148).

Although specific process blocks are described in a specific order, which corresponds with an embodiment of the present disclosure, it should be appreciated that the example process 142 is merely intended to be illustrative and not limiting. In particular, in other embodiments, a process 142 for implementing a pipe heating apparatus 58 may include one or more additional process blocks and/or omit one or more of the depicted process blocks. For example, some embodiments of the process 142 may additionally include implementing a bore seal (process block 150) while other embodiments of the process 142 do not. As another example, some embodiments of the process 142 may additionally include implementing a winch to be connected to the bore device (process block 151) while other embodiments of the process 142 do not.

As a further example, some embodiments of the process 142 may additionally include securing a centralizer circumferentially around the heating conduit (process block 152) while other embodiments of the process 142 do not. As another example, some embodiments of the process 142 may additionally include implementing a sensor (process block 154) while other embodiments of the process 142 do not. As a further example, some embodiments of the process 142 may additionally include communicatively coupling a control sub-system to the sensor and/or the heat source (process block 156) while other embodiments of the process 142 do not. Moreover, in other embodiments, one or more of the depicted process blocks may be performed in a different order, for example, such that the heating conduit and/or the heat source are implemented before the bore device.

In any case, as described above, a pipe heating apparatus 58 may generally include a bore device 60, which is implemented (e.g., manufactured and/or formed) to be moved within the pipe bore 32 of a flexible pipe 20 to facilitate isolating a segment 78 of the flexible pipe 20 for heating. Accordingly, implementing a pipe heating apparatus 58 may generally include implementing (e.g., manufacturing and/or forming) a bore device 60, which is to be moved within the pipe bore 32 of a flexible pipe 20 (process block 144).

Additionally, as described above, to facilitate heating a segment 78 of a flexible pipe 20 that is isolated by a bore device 60, a pipe heating apparatus 58 may include one or more heating conduits 64 secured to the bore device 60 such that, when the bore device 60 is disposed within the pipe bore 32, the one or more heating conduits 64 are disposed within an upstream region 86 of the pipe bore 32 behind the bore device 60, which corresponds with the flexible pipe segment 78. Accordingly, implementing a pipe heating apparatus 58 may generally include implementing one or more heating conduits 64 to be secured to a bore device 60 (process block 146).

Furthermore, as described above, to facilitate heating an upstream region 86 of the pipe bore 32 in a flexible pipe 20 and, thus, a corresponding segment 78 of the tubing 22 of the flexible pipe 20, a pipe heating apparatus 58 may include one or more heat sources 62, such as a heating fluid source 62A and/or a heating electrical power source 62B, that are each connected to one or more heating conduits 64 and, thus, a corresponding bore device 60. Accordingly, implementing a pipe heating apparatus 58 may generally include implementing a heat source 62 to be connected to a heating conduit 64 and, thus, a corresponding bore device 60 (process block 148).

In particular, as described above, in some embodiments, a segment 78 of a flexible pipe 20 that is isolated by a bore device 60 may be heated at least in part by supplying heated fluid, such as water ($H_2O$) or saltwater, to a corresponding upstream region 86 of the pipe bore 32 in the flexible pipe 20 behind the bore device 60. Accordingly, in such embodiments, implementing a heating conduit 64 may include implementing a heating fluid conduit 64A, such as a hose, that is to be secured to the bore device 60 (process block 164). Furthermore, in such embodiments, implementing a heat source 62 may include implementing a heating fluid source (e.g., pump) 62A that is to be fluidly connected to a heating fluid conduits 64A and, thus, a corresponding bore device 60 (process block 172).

Additionally or alternatively, as described above, in some embodiments, a segment 78 of a flexible pipe 20 that is isolated by a bore device 60 may be heated at least in part using heat produced by the resistance of electrically conductive material disposed within a corresponding upstream region 86 of the pipe bore 32 in the flexible pipe 20 behind the bore device 60. Accordingly, in such embodiments, implementing a heating conduit 64 may include implementing a heating electrical conduit 64B, such as a heat trace cable, that is to be electrically connected to a bore device 60 (process block 166). Furthermore, in such embodiments, implementing a heat source 62 may include implementing a heating electrical power source 62B, such as a power supply and/or an electrical grid, that is to be electrically connected to a heating electrical conduit 64B and, thus, a corresponding bore device (process block 174)

In fact, as described above, to facilitate improving pipe heating efficiency, in some embodiments, a pipe heating apparatus 58 may heat a segment 78 of a flexible pipe 20 using a heating fluid conduit 64A as well as a heating electrical conduit 64B. In particular, to facilitate concurrently deploying a heating fluid conduit 64A and a heating electrical conduit 64B within a pipe bore 32 in the same manner, in some such embodiments, the heating fluid conduit 64A and the heating electrical conduit 64B may be helically wrapped (e.g., twisted) together to form a conduit bundle 141. In other words, in such embodiments, securing heating conduits 64 to a bore device 60 may include helically wrapping a heating fluid conduit 64A and a heating electrical conduit 64B around one another to form a conduit bundle 141 and securing the conduit bundle 141 to the bore device 60 (process block 168).

In any case, as described above, in some embodiments, a bore device 60 in a pipe heating apparatus 58 may be a crawler bore device 60B, which includes an electric motor 110 and one or more device wheels 108 connected to the electric motor 110. Accordingly, in such embodiments, implementing a bore device 60 in a pipe heating apparatus 58 may include implementing (e.g., manufacturing and/or forming) a crawler bore device 60B that includes an electric motor 110 and one or more device wheels 108 connected to the electric motor 110 (process block 158). In other words, in such embodiments, the crawler bore device 60B may be electrically operated.

Accordingly, to facilitate moving a crawler bore device 60B, as described above, a pipe heating apparatus 58 may include an electrical power source 112 that is electrically connected to the crawler bore device 60B via one or more electrical conduits 114, such as a cable or wire. In fact, to facilitate reducing implementation-associated cost (e.g., physical footprint and/or component count) of a pipe heating apparatus 58, in some such embodiments, the same electrical power source 112 and the same one or more electrical conduits 114 may be used to supply electrical power to move the crawler bore device 60B as well as to heat a segment 78 of a flexible pipe 20 and, thus, the electrical power source 112 may be a heating electrical power source 62B and the one or more electrical conduits 114 may each be a heating electrical conduit 64B, such as a heat trace cable. To facilitate selectively using electrical power to power its movement, as described above, in some embodiments, a crawler bore device 60B may include a switch 126, which may be selectively connected to a motor terminal 132 that is connected to an electric motor 110 or a bypass terminal 130 that bypasses the electric motor 110. However, in other such embodiments, an electrical power source 112 and one or more electrical conduits 114 may be used to supply electrical power to facilitate moving a crawler bore device 60B within the pipe bore 32 of a flexible pipe 20 while a different heating electrical power source 62B and a different one or more heating electrical conduits 64B may be used to facilitate heating a segment 78 of the flexible pipe 20.

Moreover, as described above, in other embodiments, a bore device 60 in a pipe heating apparatus 58 may be a sealing bore device 60A, which is implemented (e.g., formed) to engage the inner surface 30 of the tubing 22 of a flexible pipe 20 to facilitate sealing an upstream region 86 of the pipe bore 32 in the flexible pipe 20 behind the sealing bore device 60A from a downstream region 88 of the pipe bore 32 in front of the sealing bore device 60A. In other words, in such embodiments, implementing a bore device 60 in a pipe heating apparatus 58 may include implementing (e.g., manufacturing and/or forming) a sealing bore device 60A that is capable of engaging the inner surface 30 of the tubing 22 of a flexible pipe 20 (process block 160). In particular, in some such embodiments, a sealing bore device 60A may be formed (e.g., implemented) at least in part using fluid blocking material, such as polyurethane foam and/or metal.

To facilitate insertion into the pipe bore 32 of a flexible pipe 20, as described above, in some embodiments, a sealing bore device 60A may include an internal fluid cavity 89 and, thus, may be inflatable. In particular, in such embodiments, the internal fluid cavity 89 may open to a fluid conduit 104 (e.g., heating fluid conduit 64A) that is connected to the sealing bore device 60A and the sealing bore device 60A may include a relief valve 92 that is fluidly connected between the internal fluid cavity 89 and an upstream region 86 of the pipe bore 32 behind the sealing bore device 60A or vice versa, thereby enabling fluid to flow out of the internal fluid cavity 89 once the sealing bore device 60A has been sufficiently inflated to seal the upstream region 86 of the pipe bore 32 from a downstream region 88 of the pipe bore 32. However, in other embodiments, a sealing bore device 60A in a pipe heating apparatus 58 may formed as a solid component, for example, which does not include an internal fluid cavity 89.

Additionally, as described above, in some embodiments, a sealing bore device 60A in a pipe heating apparatus 58 may be moved along the pipe bore 32 of a flexible pipe 20 at least in part by pressuring fluid behind the sealing bore device 60A. Thus, in such embodiments, to facilitate moving a sealing bore device 60A along a pipe bore 32, a pipe heating apparatus may include a fluid source 90 that is fluidly connected to an upstream region 86 of the pipe bore 32 behind the sealing bore device 60A via one or more fluid conduits 104, such as a hose. In fact, to facilitate reducing implementation-associated cost (e.g., physical footprint and/or component count) of a pipe heating apparatus 58, in some such embodiments, the same fluid source 90 and the same one or more fluid conduits 104 may be used to supply fluid to an upstream region 86 in the pipe bore 32 of a flexible pipe 20 to facilitate moving the sealing bore device 60A within the pipe bore 32 as well as to heat a segment 78 of the flexible pipe 20 and, thus, the fluid source 90 may be a heating fluid source 62A and the one or more fluid conduits 104 may each be a heating fluid conduit 64A, such as a hose. However, in other such embodiments, a fluid source 90 and one or more fluid conduits 104 may be used to supply fluid to the pipe bore 32 of a flexible pipe 20 to facilitate moving the sealing bore device 60A within the pipe bore 32 while a different heating fluid source 62A and a different one or more heating fluid conduits 64A may be used to facilitate heating a segment 78 of the flexible pipe 20.

To facilitate pressurizing an upstream region 86 of a pipe bore 32 in a flexible pipe 20 and, thus, moving a sealing bore device 60A along the pipe bore 32, in such embodiments, a pipe heating apparatus 58 may additionally include a bore seal 96, which is implemented to facilitate sealing an open end 80 of the flexible pipe 20 and, thus, the pipe bore 32. Accordingly, in such embodiments, implementing a pipe heating apparatus 58 may include implementing (e.g., forming) a bore seal 96, which is to be used to seal a pipe bore 32 behind a corresponding bore device 60. In particular, in some such embodiments, a bore seal 96 in a pipe heating apparatus 58 may be formed at least in part using elastic material, such as rubber. Additionally, in some such embodiments, a bore seal 96 in a pipe heating apparatus 58 may be a plug, which is implemented to be inserted into the pipe bore 32 via an open end 80 of the flexible pipe 20, or an end cap, which is implemented to be secured circumferentially around the tubing 22 of the flexible pipe 20 such that it covers and, thus, facilitates sealing an open end 80 of the flexible pipe 20 and, thus, the pipe bore 32 of the flexible pipe 20.

In any case, as described above, a heating conduit 64 may be secured to a bore device 60 in a pipe heating apparatus 58 while the bore device 60 is disposed within the pipe bore 32 of a flexible pipe 20. Thus, to enable the bore device 60 to be moved along the pipe bore 32 via pressurized fluid, a bore seal 96 in the pipe heating apparatus 58 may include a conduit opening 98, which opens therethrough to enable the heating conduit 64 to pass through the bore seal 96, and a conduit seal 100, which is disposed within the conduit opening 98 to facilitate blocking fluid from inadvertently leaking past the bore seal 96 via the conduit opening 98. Additionally, to facilitate circulating fluid through an upstream region 86 of a pipe bore 32 behind a bore device 60, in some embodiments, a bore seal 96 in a pipe heating apparatus 58 may include a seal fluid port 102 that opens therethrough to enable a fluid supply port as well as a fluid return port of a heating fluid source 62A to be fluidly connected to the upstream region 86 of the pipe bore 32. Accordingly, in some embodiments, implementing a bore seal 96 may include implementing (e.g., forming) the bore seal 96 to include a conduit opening 98, which opens therethrough to accommodate a heating conduit 64, a conduit seal 100, which is disposed within the conduit opening 98 to facilitate blocking fluid from inadvertently leaking past the bore seal 96, a seal fluid port 102, which opens therethrough to facilitate circulating fluid through an upstream region 86 of a pipe bore 32, or any combination thereof (process block 162). In particular, in some such embodiments, a conduit seal 100 in a bore seal 96 may be formed at least in part using elastic material, such as rubber.

However, as described above, in other embodiments, a bore device 60 in a pipe heating apparatus 58 may be moved along the pipe bore 32 of a flexible pipe 20 at least in part by pulling the bore device 60 from an open end 80 of the flexible pipe 20 using a winch 140 that is connected to the bore device 60, for example, via one or more pulling cables 138 and/or one or more heating conduits 64 wrapped on the winch 140. Accordingly, in such embodiments, implementing a pipe heating apparatus 58 may include implementing (e.g., forming and/or manufacturing) a winch 140 that is to be connected to a bore device 60 (process block 151). In particular, in some such embodiments, a pulling cable 138 that is wrapped on a winch 140 may be connected to a bore device 60 opposite a heating conduit 64 and, thus, the winch 140 may be operated to pull the bore device 60 farther into a corresponding pipe bore 32 at least in part by retracting the pulling cable 138. Additionally or alternatively, a heating conduit 64 that is connected to a bore device 60 may be wrapped on a winch 140 to enable the winch 140 to pull the bore device 60 back out of a corresponding pipe bore 32 at least in part by retracting the heating conduit 64.

In any case, as described above, to facilitate improving pipe heating uniformity, in some embodiments, a pipe heating apparatus 58 may additionally include one or more centralizers 134 secured circumferentially around a heating conduit 64 such that at least a portion of the outer surface 136 of each centralizer 134 is expected to rest against (e.g., directly abuts) the inner surface 30 of the tubing 22 of a flexible pipe 20 and, thus, facilitates holding the heating conduit 64 more central within the pipe bore 32 of the flexible pipe 20. Accordingly, in such embodiments, implementing a pipe heating apparatus 58 may include securing one or more centralizers 134 circumferentially around a heating conduit 64 (process block 152). In particular, in some such embodiments, a centralizer 134 in a pipe heating apparatus 58 may be a foam centralizer 134 or an inflatable (e.g., pneumatic) centralizer 134, such as an inflatable packer.

Furthermore, as described above, to facilitate controlling pipe heating and/or movement of a bore device 60, in some embodiments, a pipe heating apparatus 58 may include one or more sensors 67, such as a temperature sensor 67, a pressure sensor 67, and/or a power (e.g., voltage and/or current) sensor 67. Accordingly, in such embodiments, implementing a pipe heating apparatus 58 may include implementing (e.g., forming and/or manufacturing) one or more sensors 67, such as a temperature sensor 67, a pressure sensor 67, and/or a power (e.g., voltage and/or current) sensor 67 (process block 154). For example, to facilitate controlling movement of a bore device 60 within a pipe bore 32, the pipe heating apparatus 58 may include a pressure sensor 67 that is fluidly connected to an upstream region 86 of the pipe bore 32 behind the bore device 60. Additionally or alternatively, to facilitate determining the temperature of the tubing 22 of a flexible pipe 20, the pipe heating apparatus 58 may include a temperature sensor 67 that is fluidly connected to an upstream region 86 of the pipe bore 32 behind the bore device 60 and/or a power sensor 67 that is electrically connected between a heating electrical power source 62B and a bore device 60.

Moreover, as described above, to facilitate automating operation, in some embodiments, a pipe heating apparatus 58 may additionally include a control sub-system 66, which is communicatively coupled to one or more sensors 67 and/or a heat source 62 in the pipe heating apparatus 58. Accordingly, in such embodiments, implementing a pipe heating apparatus 58 may include communicatively coupling a control sub-system 66 to one or more sensors 67, a heat source 62, or both, for example, via a wired connection and/or a wireless connection. In any case, in this manner, a pipe heating apparatus 58 may be implemented to enable the pipe heating apparatus 58 to operate to facilitate heating a segment 78 of a flexible pipe 20, which, at least in some instances, may facilitate improving deployment efficiency of a pipeline system 10 in which the flexible pipe segment 78 is to be deployed, for example, by enabling the flexible pipe segment 78 to be deployed directly from a corresponding pipe coil 54 into the pipeline system 10.

Figure 11:
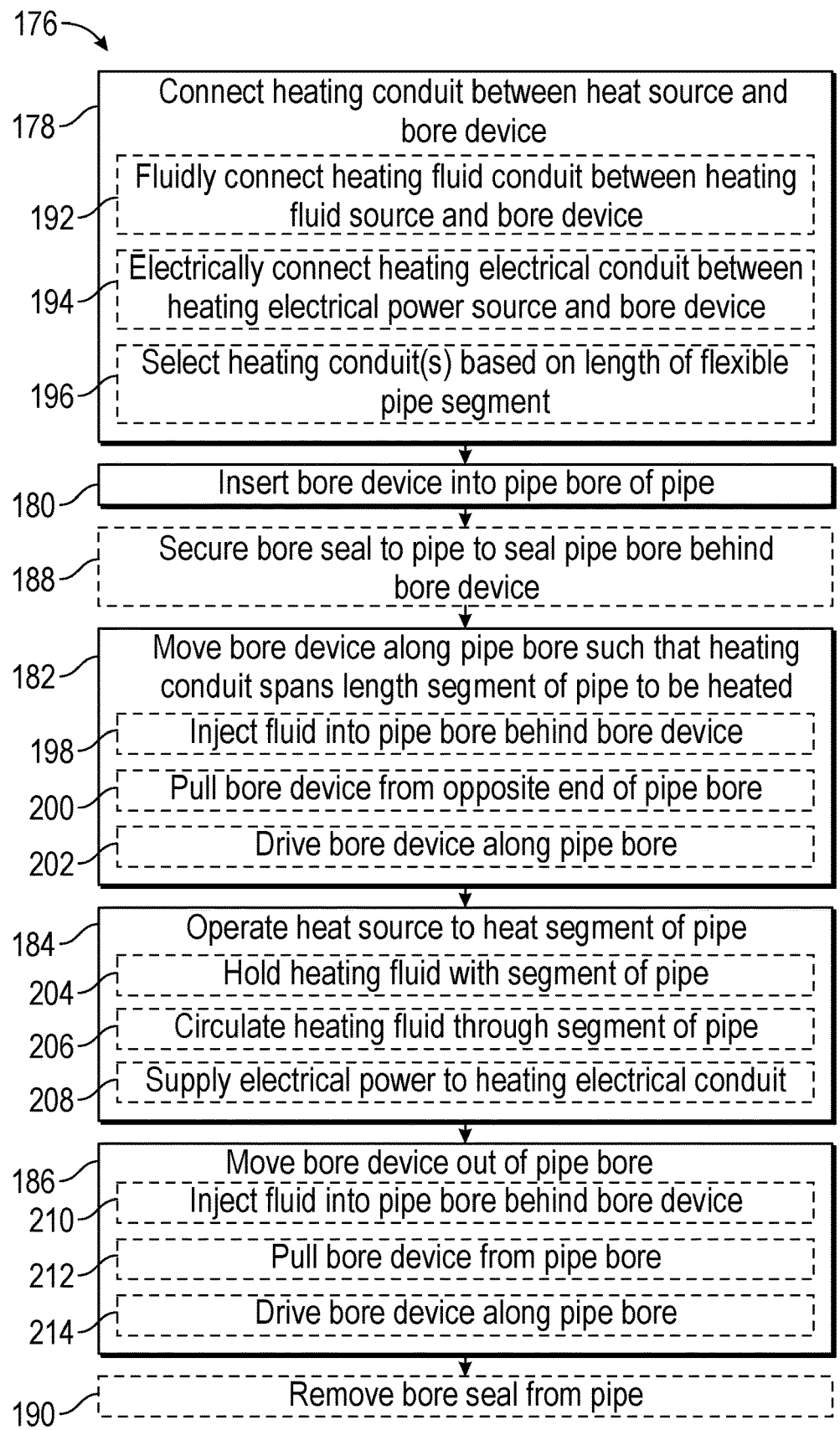
FIG. 11 is a flow diagram of an example of a process for operating a pipe heating apparatus, in accordance with an embodiment of the present disclosure.

To help further illustrate, an example of a process 176 for operating a pipe heating apparatus 58 is described in FIG. 11. Generally, the process 176 includes connecting a heating conduit between a heat source and a bore device (process block 178), inserting the bore device into a pipe bore of a flexible pipe (process block 180), and moving the bore device along the pipe bore such that the heating conduit spans a length of a segment of the flexible pipe that is to be heated (process block 182). Additionally, the process 176 generally includes operating the heat source to heat the segment of the flexible pipe (process block 184) and moving the bore device out of the pipe bore (process block 186).

Although specific process blocks are described in a specific order, which corresponds with an embodiment of the present disclosure, it should be appreciated that the example process 176 is merely intended to be illustrative and not limiting. In particular, in other embodiments, a process 176 for operating a pipe heating apparatus 58 may include one or more additional process blocks and/or omit one or more of the depicted process blocks. For example, some embodiments of the process 176 may additionally include securing a bore seal to the flexible pipe to seal the pipe bore behind the bore device (process block 188) and removing the bore seal from the flexible pipe (process block 190) while other embodiments of the process 176 do not. Moreover, in other embodiments, one or more of the depicted process blocks may be performed in a different order, for example, which that the bore device is inserted into the pipe bore before the heating conduit is connected between the heat source and the bore device.

In any case, as described above, a pipe heating apparatus 58 may generally include a bore device 60, which is to be moved within the pipe bore 32 of a flexible pipe 20 to facilitate isolating a segment 78 of the tubing 22 of the flexible pipe 20 that corresponds with an upstream region 86 of the pipe bore 32 behind the bore device 60 for heating. In particular, the pipe heating apparatus 58 may heat the upstream region 86 of the pipe bore 32 and, thus, the segment 78 of the flexible pipe tubing 22 via one or more heating conduits 64, which are connected between a heat source 62 and a bore device 60 such that they are disposed within the upstream region 86 of the pipe bore 32. Accordingly, operating a pipe heating apparatus 58 may generally include connecting one or more heating conduits 64 between a heat source 62 and a bore device 60 (process block 178), inserting the bore device 60 into the pipe bore 32 of a flexible pipe 20 via an open end 80 of the flexible pipe 20 (process block 180), and moving the bore device 60 along the pipe bore such that one or more heating conduits 64 span the length of a segment 78 of the flexible pipe 20 that is to be heated (process block 182).

In particular, as described above, to facilitate heating a segment 78 of a flexible pipe 20 that is isolated by a bore device, in some embodiments, a heat source 62 in a pipe heating apparatus 58 may be a heating fluid source 62A and, thus, a heating conduit 64 connected between the heat source 62 and the bore device 60 may be a heating fluid conduit 64A, such as a hose. In other words, in such embodiments, connecting a heating conduit 64 between a heat source 62 and a bore device 60 may include fluidly connecting a heating fluid conduit 64A, such as a hose, between a heating fluid source (e.g., pump) 62A and a bore device 60 (process block 192). Additionally or alternatively, as described above, to facilitate heating a segment 78 of a flexible pipe 20 isolated by a bore device 60, in some embodiments, a heat source 62 in a pipe heating apparatus 58 may be a heating electrical power source 62B and, thus, a heating conduit 64 connected between the heat source 62 and the bore device 60 may be a heating electrical conduit 64B, such as a heat trace cable. In other words, in such embodiments, connecting a heating conduit 64 between a heat source 62 and a bore device 60 may include electrically connecting a heating electrical conduit 64B, such as a heat trace cable, between a heating electrical power source 62B, such as an electrical power supply and/or an electrical grid, and a bore device 60 (process block 194).

Furthermore, as described above, in some embodiments, a bore device 60 in a pipe heating apparatus 58 may be a sealing bore device 60A and, thus, moved to a target position within a pipe bore 32 at least in part by injecting (e.g., supplying) fluid into the pipe bore 32 behind the sealing bore device 60A (process block 198). In fact, to facilitate reducing implementation-associated cost (e.g., such as component count and/or physical footprint) of a pipe heating apparatus 58, in some such embodiments, a heating fluid source 62 used to heat a flexible pipe 20 may additionally be used to move a bore device 60 within the pipe bore 32 of the flexible pipe 20. In other words, in such embodiments, injecting fluid into a pipe bore 32 behind a bore device 60 may include operating a heating fluid source 62A to inject heated fluid into the pipe bore 32 behind the bore device 60, thereby facilitating pressurization of an upstream region 86 of the pipe bore 32 behind the bore device 60 and, thus, movement of the bore device 60 along the pipe bore 32.

To facilitate pressuring an upstream region 86 of the pipe bore 32 in a flexible pipe 20 and, thus, moving a sealing bore device 60A along the pipe bore 32, as described above, in some embodiments, a pipe heating apparatus 58 may additionally include a bore seal 96, which is secured to the flexible pipe 20 to seal an open end 80 of the flexible pipe 20 behind the sealing bore device 60A. Accordingly, in such embodiments, operating a pipe heating apparatus 58 may include securing a bore seal 96 to an open end 80 of a flexible pipe 20 to facilitate sealing the pipe bore 32 of the flexible pipe 20 behind a corresponding bore device 60 (process block 188). In particular, in some such embodiments, a bore seal 96 in a pipe heating apparatus 58 may be a plug that is inserted into the pipe bore 32 of a flexible pipe 20 or an end cap that is secured circumferentially around an open end 80 of a flexible pipe 20 such that the end cap covers the pipe bore 32 of the flexible pipe 20.

However, as described above, in other embodiments, a pipe heating apparatus 58 may include a winch 140 and a pulling cable 138, which is wrapped on the winch 140 and connected to a bore device 60 opposite a heating conduit 64. Accordingly, in such embodiments, moving a bore device 60 to a target position within a pipe bore 32 may include operating a winch 140 to pull the bore device 60 from an opposite end of the pipe bore 32 (process block 200).

Moreover, as described above, in other embodiments, a bore device 60 in a pipe heating apparatus 58 may be a crawler bore device 60B, which includes an electric motor 110 and one or more device wheels 108 connected to the electric motor 110, and, thus, capable of moving (e.g., driving) itself when electrical power is supplied to the electric motor 110. Accordingly, in such embodiments, moving a crawler bore device 60B to a target position within a pipe bore 32 may include supplying electrical power to an electric motor 110 in the crawler bore device 60B to drive the crawler bore device 60B along the pipe bore 32 (process block 202). To facilitate selecting between using electrical power to move a crawler bore device 60B or merely to heat a segment 78 of a flexible pipe 20, in such embodiments, the crawler bore device 60B may include a switch 126 that may be selectively connected to a motor terminal 132, which is electrically connected to an electric motor 110 in the crawler bore device 60B, or a bypass terminal 130, which bypasses the electric motor 110 in the crawler bore device 60B. Accordingly, to facilitate driving the crawler bore device 60B, in such embodiments, the switch 126 may be connected to the motor terminal 132 and, thus, the electric motor 110, thereby enabling electrical power to be supplied to the electric motor 110 and, thus, the electric motor 110 to actuate one or more device wheels 108.

In any case, once a bore device 60 is at a target position in the pipe bore 32 of a flexible pipe 20 that facilitates isolating a segment 78 of the flexible pipe 20, a pipe heating apparatus 58 may operate a heat source 62 to heat the segment 78 of the flexible pipe 20 (process block 184). For example, as described above, in some embodiments, operating a pipe heating apparatus 58 to heat a segment 78 of a flexible pipe may include operating the pipe heating apparatus 58 to hold heated fluid output by a heating fluid source 62A within an upstream region 86 in the pipe bore 32 of the flexible pipe 20 that corresponds with the flexible pipe segment 78 (process block 204) and/or operating the pipe heating apparatus 58 to circulate heated fluid output by the heating fluid source 62A through the upstream region 86 in the pipe bore 32 of the flexible pipe 20 that corresponds with the flexible pipe segment 78 (process block 206). In particular, in some such embodiments, a pipe heating apparatus 58 may operate to circulate heated fluid through a segment 78 of a flexible pipe 20 while a corresponding pipe deployment vehicle 46 is stationary and to hold heated fluid within the segment 78 of the flexible pipe 20 while the pipe deployment vehicle 46 is in motion.

Additionally or alternatively, as described above, in some embodiments, a pipe heating apparatus 58 may heat a segment 78 of a flexible pipe 20 using heat produced by the resistance of electrical conductive material due to electrical power being flowed therethrough. Accordingly, in such embodiments, operating a pipe heating apparatus 58 to heat a segment 78 of a flexible pipe 20 may include operating the pipe heating apparatus 58 to supply electrical power from a heating electrical power source 62B to a heating electrical conduit 64B, which is connected to a bore device 60 and disposed within an upstream region 86 in the pipe bore 32 that corresponds with the flexible pipe segment 78 (process block 208). To facilitate reducing the likelihood of electrical power supplied to a heating electrical conduit 64B that is connected to a crawler bore device 60B inadvertently causing the crawler bore device 60B to move from a target position in a pipe bore 32, as described above, in some such embodiments, a switch 126 in the crawler bore device 60B may be connected to a bypass terminal 130, which bypasses an electric motor 110 in the crawler bore device 60B. In any case, in this manner, a pipe heating apparatus 58 may be operated to facilitate selectively heating a segment 78 of a flexible pipe 20, for example, instead of the entire flexible pipe 20, which, at least in some instances, may facilitate reducing power consumption used to heat the flexible pipe 20 and, thus, improving pipe heating efficiency.

Moreover, as described above, to facilitate reducing power consumption used to heat a segment 78 of a flexible pipe 20 and, thus, further improving pipe heating efficiency, in some embodiments, different heating conduits 64 may be selectively connected to a bore device 60 in a pipe heating apparatus 58 based at least in part on the length of the flexible pipe segment 78. In other words, in such embodiments, one or more heating conduits 64 may be connected between a heat source 62 and a bore device 60 based at least in part on the length of a segment 78 of a flexible pipe 20 that is to be heated (process block 196). For example, in some such embodiments, a longer heating conduit 64 may be connected between a heat source 62 and a bore device 60 when the length of the flexible pipe segment 78 is longer while a shorter heating conduit 64 may be connected between the heat source 62 and the bore device 60 when the length of the flexible pipe segment 78 is shorter. Additionally or alternatively, more heating conduits 64 may be connected between a heat source 62 and a bore device 60 when the length of the flexible pipe segment 78 is longer while fewer heating conduits may be connected between the heat source 62 and the bore device 60 when the length of the flexible pipe segment 78 is shorter.

In any case, as described above, after a segment 78 of a flexible pipe 20 is sufficiently heated, a pipe heating apparatus 58 may operate to move a bore device 60 out of the pipe bore 32 in the flexible pipe 20 (process block 186). In particular, in some embodiments, a bore device 60 in a pipe heating apparatus 58 may be a sealing bore device 60A and, thus, moved to out of a pipe bore 32 at least in part by injecting (e.g., supplying) fluid into the pipe bore 32 behind the sealing bore device 60A (process block 210). To facilitate subsequently flowing fluid through the pipe bore 32 of a flexible pipe 20, in such embodiments, a bore seal 96 may then be removed from the flexible pipe 20 (process block 190).

However, as described above, in other embodiments, a pipe heating apparatus 58 may include a winch 140 as well as a pulling cable 138 or a heating conduit 64, which is wrapped on the winch 140 and connected to a bore device 60. Accordingly, in such embodiments, moving a bore device 60 out of a pipe bore 32 may include operating a winch 140 to pull the bore device 60 from the pipe bore 32 at least in part by retracting the pulling cable 138 or the heating conduit 64 onto the winch 140 (process block 212).

Moreover, as described above, in other embodiments, a bore device 60 in a pipe heating apparatus 58 may be a crawler bore device 60B, which includes an electric motor 110 and one or more device wheels 108 connected to the electric motor 110, and, thus, capable of moving (e.g., driving) itself when electrical power is supplied to the electric motor 110. Accordingly, in such embodiments, moving a crawler bore device 60B out of a pipe bore 32 may include supplying electrical power to an electric motor 110 in the crawler bore device 60B to drive the crawler bore device 60B out of the pipe bore 32 (process block 214). To facilitate selecting between using electrical power to move a crawler bore device 60B or merely to heat a segment 78 of a flexible pipe 20, in such embodiments, the crawler bore device 60B may include a switch 126 that may be selectively connected to a motor terminal 132, which is electrically connected to an electric motor 110 in the crawler bore device 60B, or a bypass terminal 130, which bypasses the electric motor 110. Accordingly, to facilitate driving the crawler bore device 60B, in such embodiments, the switch 126 may be connected to the motor terminal 132 and, thus, the electric motor 110, thereby enabling electrical power to be supplied to the electric motor 110 and, thus, the electric motor 110 to actuate one or more device wheels 108. In this manner, a pipe heating apparatus 58 may be implemented and/or operated to facilitate selectively heating a segment 78 of a flexible pipe 20, which, at least in some instances, may facilitate improving deployment efficiency of a pipeline system 10 in which the flexible pipe segment 78 is to be deployed, for example, by increasing flexibility of the flexible pipe 20 to enable the flexible pipe segment 78 to be deployed from a pipe coil 54 directly into the pipeline system 10.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A system comprising:
   a flexible pipe that is formed into a pipe coil, wherein the flexible pipe comprises tubing that defines a pipe bore and a fluid conduit within an annulus of the tubing; and
   a pipe heating apparatus, wherein the pipe heating apparatus comprises:
   a bore device configured to be moved to a target position within the pipe bore of the flexible pipe to facilitate isolating a segment of the flexible pipe from a remainder of the flexible pipe;
   one or more heating conduits configured to be connected to the bore device such that the one or more heating conduits are disposed in an upstream region of the pipe bore behind the bore device when the bore device is disposed within the pipe bore of the flexible pipe; and
   one or more heat sources configured to be connected to the bore device via the one or more heating conduits to enable the one or more heat sources to heat the one or more heating conduits disposed within the upstream region of the pipe bore and, thus, the one or more heating conduits to heat the segment of the flexible pipe to facilitate unwinding the segment of the flexible pipe from the pipe coil.

2. The system of claim 1, comprising a cutting assembly, wherein the cutting assembly is configured to cut the segment of the flexible pipe off from the remainder of the flexible pipe to facilitate deploying the segment of the flexible pipe directly from the pipe coil into a pipeline.

3. The system of claim 1, wherein:
   the bore device in the pipe heating apparatus is a sealing bore device configured to seal the upstream region of the pipe bore behind the bore device from a downstream region of the pipe bore;
   the one or more heating conduits in the pipe heating apparatus comprise a heating fluid conduit; and
   the one or more heat sources in the pipe heating apparatus comprise a heating fluid source configured to supply heated fluid to the upstream region of the pipe bore.

4. The system of claim 3, wherein the pipe heating apparatus comprises a bore seal configured to seal the pipe bore of the flexible pipe behind the bore device, wherein the bore seal comprises:
   a conduit opening configured to enable the heating fluid conduit that is connected to the bore device to move through the bore seal; and
   a conduit seal disposed within the conduit opening to facilitate blocking fluid from inadvertently leaking past the bore seal via the conduit opening.

5. The system of claim 3, wherein:
   a fluid supply port of the heating fluid source is configured to be fluidly connected to the pipe bore of the flexible pipe; and
   the pipe heating apparatus comprises a fluid valve configured to be fluidly connected between the pipe bore of the flexible pipe and a fluid return port of the heating fluid source, wherein the fluid valve is configured to be:
   maintained in an opened state to enable heated fluid output by the heating fluid source to be circulated through the upstream region of the pipe bore behind the bore device to facilitate heating the segment of the flexible pipe; and
   maintained in a closed state to enable heated fluid output by the heating fluid source to be held within the upstream region of the pipe bore behind the bore device to facilitate maintaining temperature of the segment of the flexible pipe.

6. The system of claim 3, comprising a pipe deployment vehicle, wherein:
   the pipe coil is loaded on a vehicle frame of the pipe deployment vehicle;
   the pipe heating apparatus is secured to the vehicle frame of the pipe deployment vehicle; and
   the pipe heating apparatus is configured to:
   circulate heated fluid output by the heating fluid source through the upstream region of the pipe bore behind the bore device to facilitate heating the segment of the flexible pipe when the pipe deployment vehicle is stationary; and
   hold heated fluid output by the heating fluid source within the upstream region of the pipe bore behind the bore device to facilitate maintaining temperature of the segment of the flexible pipe when the pipe deployment vehicle is moving.

7. The system of claim 3, wherein:
   the one or more heating conduits in the pipe heating apparatus comprise a heating electrical conduit, wherein the heating electrical conduit and the heating fluid conduit are wrapped together to form a conduit bundle that is secured to the bore device; and
   the one or more heat sources in the pipe heating apparatus comprise a heating electrical power source configured to supply electrical power to the heating electrical conduit to facilitate heating the segment of the flexible pipe.

8. The system of claim 1, wherein the pipe heating apparatus comprises:
   a winch; and
   a pulling cable that is wrapped on the winch, wherein:

the pulling cable is configured to be fed through the pipe bore of the flexible pipe and connected to the bore device opposite the one or more heating conduits; and the winch is configured to retract the pulling cable to facilitate moving the bore device within the pipe bore of the flexible pipe.

9. The system of claim 1, wherein the pipe heating apparatus comprises a winch, wherein:

the one or more heating conduits that are connected to the bore device are wound on the winch; and the winch is configured to retract the one or more heating conduits to facilitate moving the bore device within the pipe bore of the flexible pipe.

10. The system of claim 1, wherein:

the one or more heating conduits in the pipe heating apparatus comprise a heating electrical conduit; and the one or more heat sources in the pipe heating apparatus comprise a heating electrical power source configured to supply electrical power to the heating electrical conduit to facilitate heating the segment of the flexible pipe.

11. The system of claim 10, wherein the bore device in the pipe heating apparatus is a crawler bore device that comprises an electric motor and one or more device wheels connected to the electric motor.

12. The system of claim 11, wherein the crawler bore device comprises:

a switch configured to be electrically connected to the heating electrical conduit;

a motor terminal electrically connected to the electric motor, wherein the switch is configured to be connected to the motor terminal to enable the pipe heating apparatus to use electrical power output by the heating electrical power source to move the crawler bore device within the pipe bore of the flexible pipe; and a bypass terminal that bypasses the electric motor, wherein the switch is configured to be connected to the bypass terminal to enable the pipe heating apparatus to use electrical power output by the heating electrical power source merely to heat the segment of the flexible pipe.

13. A method of operating a pipe heating apparatus, comprising:

connecting one or more heating conduits between a heat source and a bore device in the pipe heating apparatus;

inserting the bore device into a pipe bore of a flexible pipe that is formed into a pipe coil; and operating the heat source to facilitate:

moving the bore device to a target position in the pipe bore of the flexible pipe that facilitates isolating a segment of the flexible pipe that is to be deployed directly from the pipe coil into a pipeline system; and heating the segment of the flexible pipe to facilitate unwinding the segment of the flexible pipe from the pipe coil and deploying the segment of the flexible pipe directly from the pipe coil into the pipeline system.

14. The method of claim 13, wherein:

connecting one or more heating conduits between the heat source and the bore device comprises connecting a heating fluid conduit between a heating fluid source and the bore device; and operating the heat source comprises operating the heating fluid source to supply heated fluid to an upstream region of the pipe bore behind the bore device.

15. The method of claim 14, wherein operating the heating fluid source comprises:

circulating heated fluid output by the heating fluid source through the upstream region of the pipe bore behind the bore device to facilitate heating the segment of the flexible pipe; and holding heated fluid output by the heating fluid source within the upstream region of the pipe bore behind the bore device to facilitate maintaining temperature of the segment of the flexible pipe.

16. The method of claim 13, comprising sealing the pipe bore of the flexible pipe behind the bore device via a bore seal.

17. The method of claim 13, wherein:

connecting one or more heating conduits between the heat source and the bore device comprises connecting a heating electrical conduit between a heating electrical power source and the bore device; and operating the heat source comprises operating the heating electrical power source to supply electrical power to the heating electrical conduit.

18. The method of claim 17, comprising:

connecting a switch in the bore device that is electrically connected to the heating electrical conduit to a motor terminal that is electrically connected to an electric motor in the bore device to enable the bore device to drive within the pipe bore of the flexible pipe using electrical power supplied to the heating electrical conduit by the heating electrical power source; and connecting the switch in the bore device to a bypass terminal that bypasses the electric motor in the bore device to enable the pipe heating apparatus to merely heat the segment of the flexible pipe using electrical power supplied to the heating electrical conduit by the heating electrical power source.

19. A pipe heating apparatus, comprising:

a sealing bore device configured to seal an upstream region of a pipe bore in a flexible pipe behind the sealing bore device that corresponds with a segment of the flexible pipe that is to be deployed in a pipeline system from a downstream region of the pipe bore that corresponds with a remainder of the flexible pipe;

a heating fluid source configured to output heated fluid;

a heating fluid conduit configured to be fluidly connected between the heating fluid source and the sealing bore device such that heating fluid conduit is disposed within the upstream region of the pipe bore when the sealing bore device is disposed within the pipe bore of the flexible pipe; and a bore seal configured to seal the pipe bore of the flexible pipe behind the sealing bore device to facilitate:

using heated fluid output by the heating fluid source to heat the segment of the flexible pipe; and selectively using heated fluid output by the heating fluid source to move the sealing bore device along the pipe bore of the flexible pipe.

20. The pipe heating apparatus of claim 19, comprising:

a heating electrical power source configured to output electrical power;

a heating electrical conduit configured to be electrically connected between the heating electrical power source and the sealing bore device such that heating electrical conduit is disposed within the upstream region of the pipe bore when the sealing bore device is disposed within the pipe bore of the flexible pipe to facilitate using heat produced by the heating electrical conduit due to electrical power flowing therethrough to heat the segment of the flexible pipe.

\* \* \* \* \*